(12) United States Patent
Tsuchiya

(10) Patent No.: US 10,540,680 B2
(45) Date of Patent: Jan. 21, 2020

(54) INFORMATION PROCESSING DEVICE, INFORMATION PROCESSING METHOD, AND INFORMATION PROCESSING PROGRAM

(71) Applicant: Rakuten, Inc., Tokyo (JP)

(72) Inventor: Takanori Tsuchiya, Tokyo (JP)

(73) Assignee: Rakuten, Inc., Tokyo (JP)

( * ) Notice: Subject to any disclaimer, the term of this patent is extended or adjusted under 35 U.S.C. 154(b) by 589 days.

(21) Appl. No.: 15/304,185

(22) PCT Filed: Jun. 27, 2014

(86) PCT No.: PCT/JP2014/067164
§ 371 (c)(1),
(2) Date: Oct. 14, 2016

(87) PCT Pub. No.: WO2015/198474
PCT Pub. Date: Dec. 30, 2015

(65) Prior Publication Data
US 2017/0032411 A1 Feb. 2, 2017

(51) Int. Cl.
*G06Q 30/00* (2012.01)
*G06Q 30/02* (2012.01)
*G05B 19/418* (2006.01)

(52) U.S. Cl.
CPC ................. *G06Q 30/0246* (2013.01)

(58) Field of Classification Search
None
See application file for complete search history.

(56) References Cited

U.S. PATENT DOCUMENTS

| 7,822,636 B1* | 10/2010 | Ferber | G06Q 30/02 705/14.4 |
| 2007/0078707 A1* | 4/2007 | Axe | G06Q 30/02 705/14.41 |
| 2013/0262218 A1* | 10/2013 | Wang | G06Q 30/02 705/14.43 |

FOREIGN PATENT DOCUMENTS

JP 2008-257422 A 10/2008

OTHER PUBLICATIONS

Online Advertisement Campaign Optimization. Weiguo Liu (Year: 2007).*

* cited by examiner

*Primary Examiner* — Maria V Vanderhorst
(74) *Attorney, Agent, or Firm* — Sughrue Mion, PLLC

(57) ABSTRACT

An advertisement is delivered based on a first limiting element, a specified number of selections, and an expected selection rate. Based on an expected number of selections and an actual number of selections of the advertisement before the end of a counting period, the number of selections to be further needed at the end of the counting period is estimated. For each of a plurality of second limiting elements different from the first limiting element, an actual selection rate of the advertisement by a group, among the recipients of the advertisement, limited by the second limiting element is obtained. Based on the actual selection rates, a limiting element to be added to delivery requirements from among the plurality of second limiting elements is determined. Based on the determined limiting element, the corresponding actual selection rate, and the estimated number of selections, additional recipients of the advertisement are determined.

7 Claims, 11 Drawing Sheets

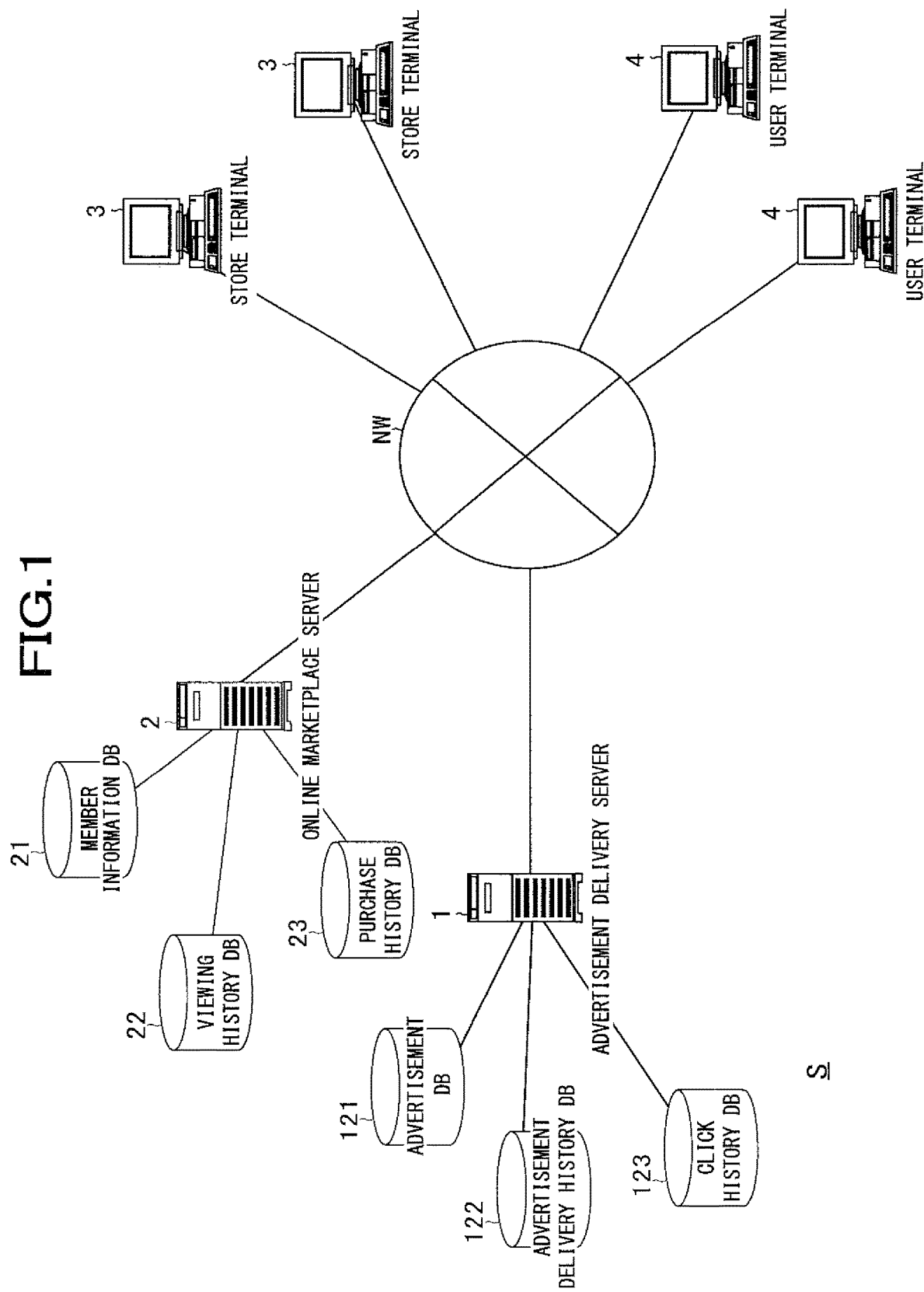

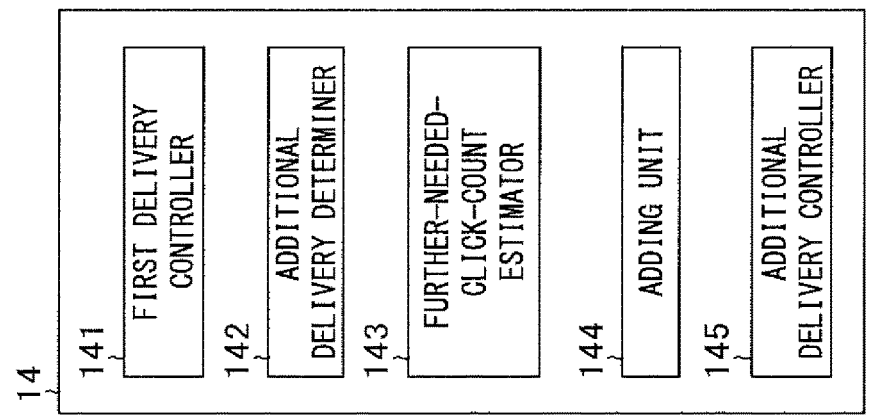
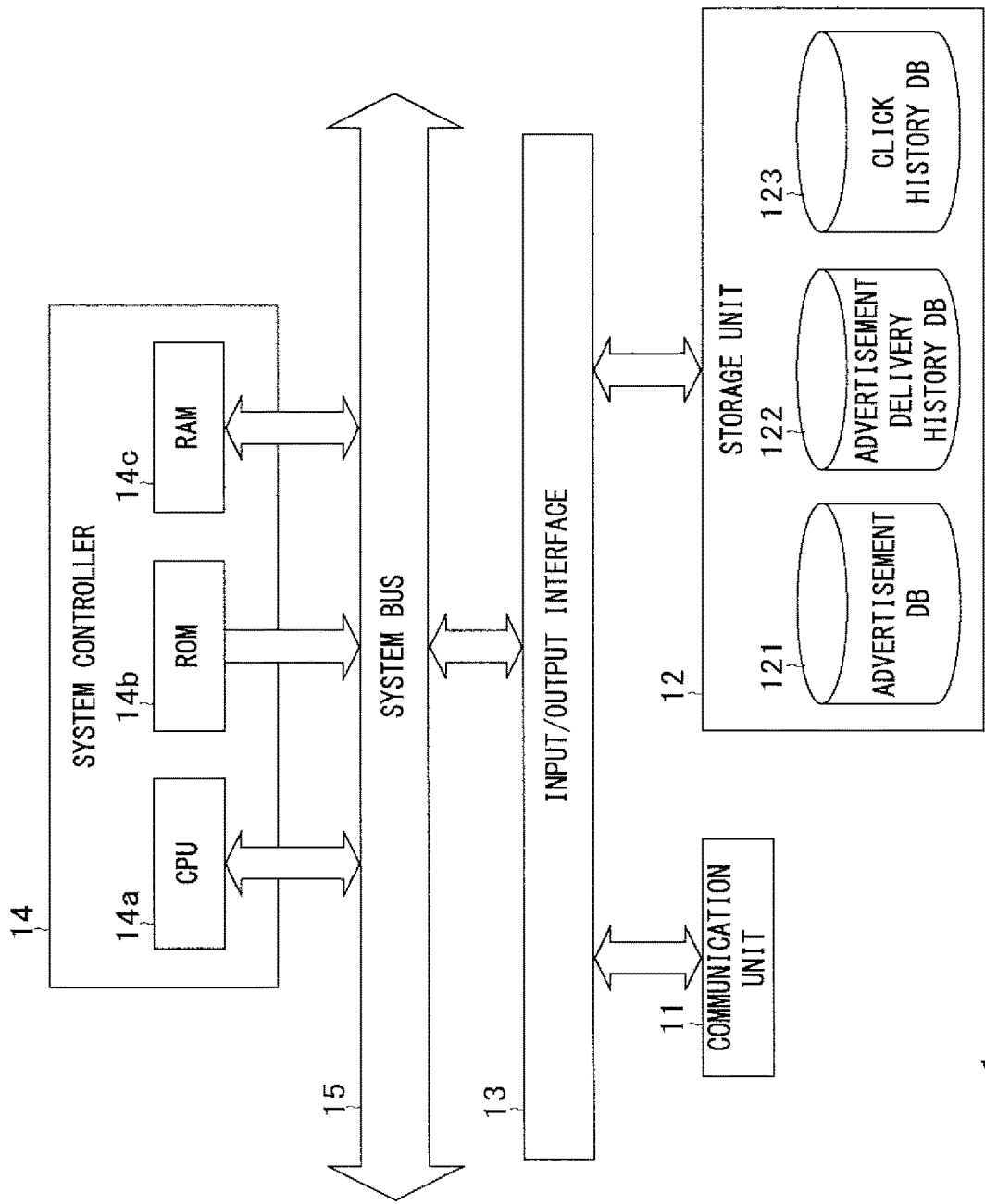

FIG.3A
MEMBER INFORMATION DB 21

| USER ID |
| --- |
| PASSWORD |
| NICKNAME |
| NAME |
| MEMBER RANK |
| BIRTH DATE |
| AGE GROUP |
| GENDER |
| ZIP CODE |
| ADDRESS |
| AREA OF RESIDENCE |
| TELEPHONE NUMBER |
| EMAIL ADDRESS |
| . . . |

FIG.3B
VIEWING HISTORY DB 22

| USER ID |
| --- |
| VIEWED DATE AND TIME |
| URL |
| . . . |

FIG.3C
PURCHASE HISTORY DB 23

| ORDER NUMBER |
| --- |
| ORDER DATE AND TIME |
| USER ID |
| STORE ID |
| ITEM ID |
| PRODUCT CODE |
| CATEGORY ID |
| UNIT PRICE |
| . . . |

FIG.3D
ADVERTISEMENT DB 121

| ADVERTISEMENT ID |
| --- |
| STORE ID |
| ITEM ID |
| PRODUCT CODE |
| CATEGORY ID |
| ADVERTISEMENT CONTENT |
| DELIVERY REQUIREMENTS |
| . . . |

FIG.3E
DELIVERY REQUIREMENTS

| DESIRED NUMBER OF CLICKS |
| --- |
| SPECIFIED PERIOD |
| RECIPIENT REQUIREMENTS |
| . . . |

FIG.3F
ADVERTISEMENT DELIVERY HISTORY DB 122

| ADVERTISEMENT ID |
| --- |
| DELIVERY DATE AND TIME |
| THE NUMBER OF DELIVERIES |
| RECIPIENT LIST |
| . . . |

FIG.3G
CLICK HISTORY DB 123

| ADVERTISEMENT ID |
| --- |
| USER ID |
| CLICK DATE AND TIME |
| . . . |

FIG.4A

| DESIRED NUMBER OF CLICKS | | 30,000 |
|---|---|---|
| LENGTH OF SPECIFIED PERIOD | | 7 |
| RECIPIENT REQUIREMENTS | AGE GROUP | 30'S |
| | GENDER | WOMAN |
| | AREA OF RESIDENCE | KANTO |

FIG.4B

| EXPECTED CTR FOR SEVEN DAYS | 0.03 |
|---|---|
| THE NUMBER OF FIRST DELIVERIES | 1,000,000 |

FIG.4C

| THE NUMBER OF ELAPSED DAYS | EXPECTED ACHIEVEMENT RATE | THE EXPECTED NUMBER OF CLICKS | THE ACTUAL NUMBER OF CLICKS | ESTIMATED NUMBER OF FURTHER NEEDED CLICKS AT END OF PERIOD |
|---|---|---|---|---|
| 1 | 0.5 | 15,000 | 16,000 | |
| 2 | 0.75 | 22,500 | 20,250 | 3,000 |
| 3 | 0.85 | 25,500 | | |
| 4 | 0.95 | 28,500 | | |
| 5 | 0.975 | 29,250 | | |
| 6 | 0.9875 | 29,625 | | |
| 7 | 1 | 30,000 | | |

FIG.4D

| LOG OF VIEWING ITEM PAGE FOR ITEM THAT HAS THE SAME ATTRIBUTE AS ITEM TO BE ADVERTISED | ACTUAL CTR TWO DAYS LATER | EXPECTED CTR FIVE DAYS LATER | THE NUMBER OF UNRECIPIENT USERS | EXPECTED NUMBER OF ADDITIONAL CLICKS FIVE DAYS LATER |
|---|---|---|---|---|
| EXIST | 0.05 | 0.065 | 78,000 | 5,070 |
| NOT EXIST | 0.01 | 0.013 | 115,000 | 1,495 |

FIG.4E

| LOG OF PURCHASING ITEM THAT HAS THE SAME ATTRIBUTE AS ITEM TO BE ADVERTISED | ACTUAL CTR TWO DAYS LATER | EXPECTED CTR FIVE DAYS LATER | THE NUMBER OF UNRECIPIENT USERS | EXPECTED NUMBER OF ADDITIONAL CLICKS FIVE DAYS LATER |
|---|---|---|---|---|
| EXIST | 0.03 | 0.039 | 22,000 | 858 |
| NOT EXIST | 0.02 | 0.026 | 180,000 | 4,680 |

FIG.5A

| LIMITING ELEMENT | ACTUAL CTR |
|---|---|
| A-1 | 0.08 |
| A-2 | 0.02 |
| B-1 | 0.04 |
| B-2 | 0.05 |
| B-3 | 0.03 |
| C-1 | 0.07 |
| C-2 | 0.06 |
| D-1 | 0.01 |
| D-2 | 0.02 |

FIG.5B

| ADDITIONAL REQUIREMENT | EXPECTED NUMBER OF ADDITIONAL CLICKS AT END OF PERIOD |
|---|---|
| A-1 | 6,000 |
| A-1, C-1 | 4,000 |
| A-1, C-1, B-2 | 3,100 |

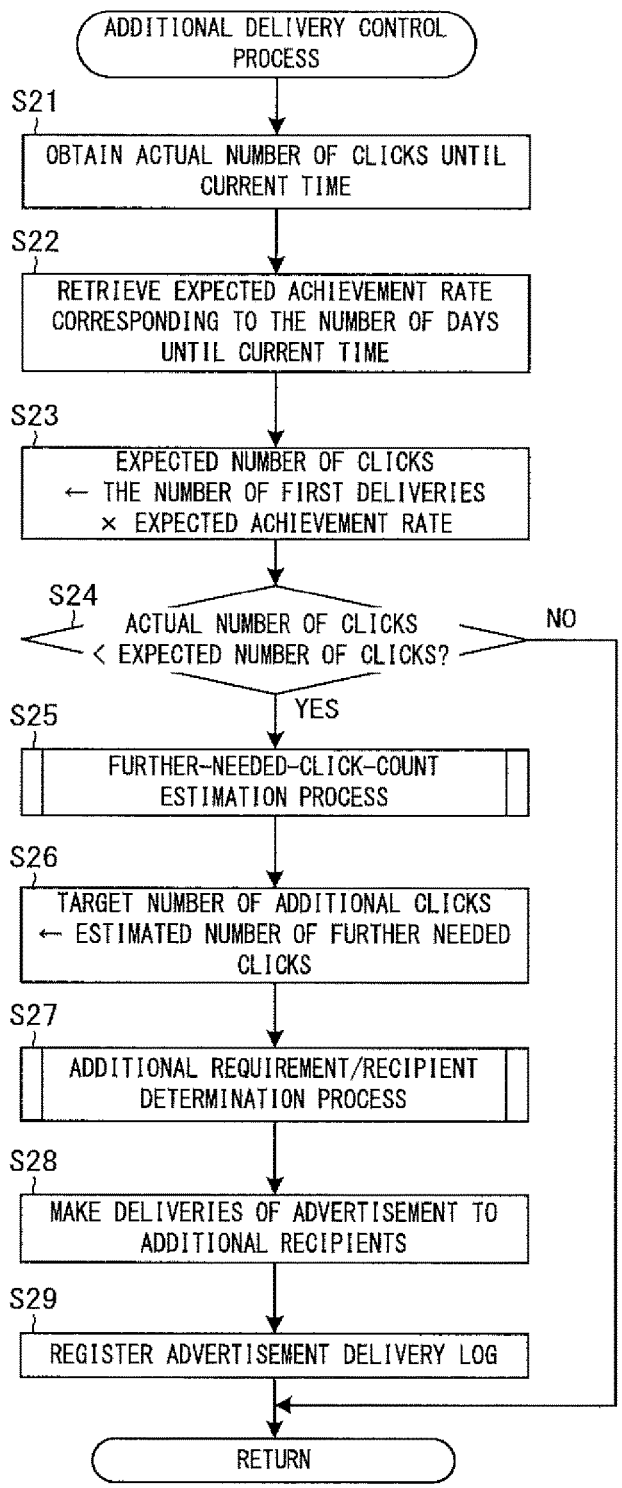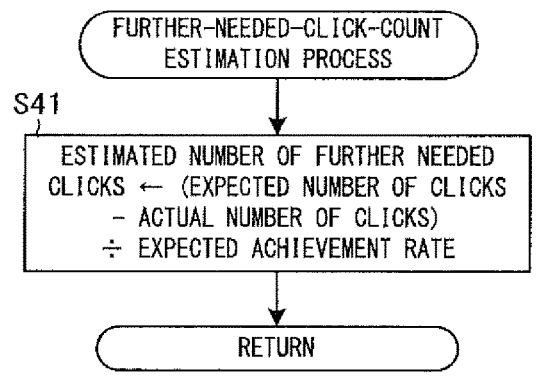

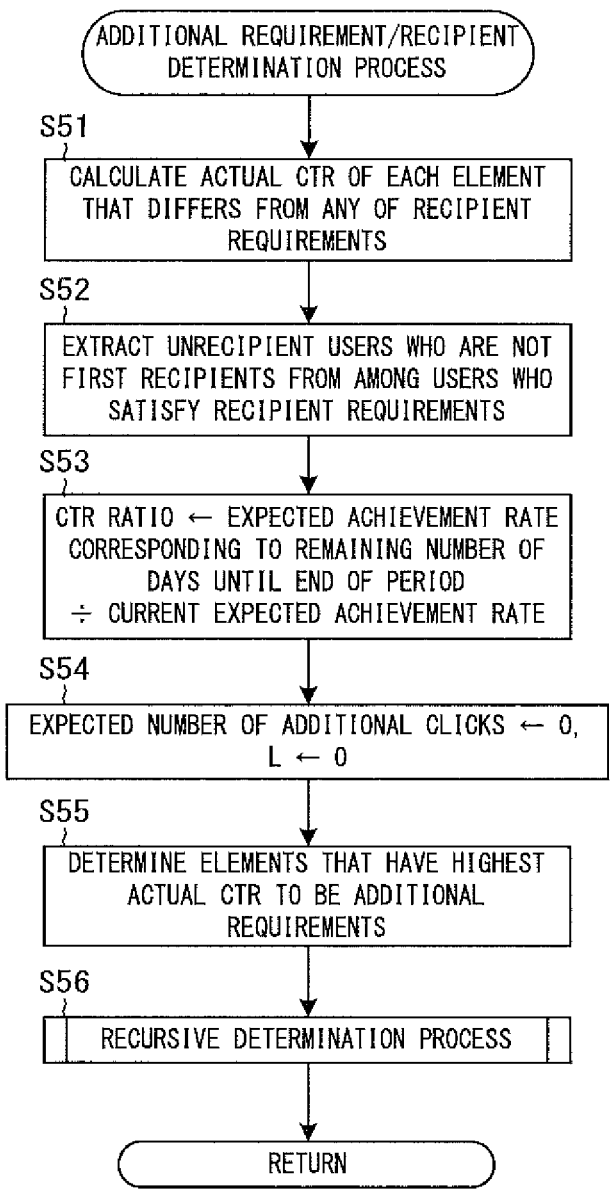

US 10,540,680 B2

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2014/067164, filed Jun. 27, 2014, the contents of which are incorporated herein by reference in its entirety.

TECHNICAL FIELD

The present invention relates to a technique for delivering advertisements.

BACKGROUND ART

A technique by which an advertisement deliverer, which receives a request from an advertiser, makes deliveries of an advertisement, for example, using emails is conventionally known. In such an advertisement, for example, a link to a web page of an advertiser is embedded. When a user selects the link, the user's terminal device accesses the web page (e.g., Patent Literature 1).

CITATION LIST

Patent Literature

Patent Literature 1: JP 2008-257422 A

SUMMARY OF INVENTION

Technical Problem

There may be a case where an advertisement deliverer wishes to make deliveries of an advertisement so that the number of selections of the advertisement (the number of link clicks) by recipient users during a set period will be greater than or equal to the number of selections desired by an advertiser. In this case, a small number of deliveries of the advertisement may cause the problem that the number of actual selections falls short of the advertiser's desired number of selections. On the other hand, an excessively large number of deliveries increase the probability that the number of actual selections will be greater than or equal to the desired number of selections. However, the load of a server device that delivers the advertisement is increased, and efficiency in deliveries of the advertisement relative to the desired number of selections is reduced.

In view of the above point, it is an object of the present invention to provide an information processing device, an information processing method, and an information processing program that allow for more efficient deliveries of an advertisement while increasing the probability that the number of selections of the advertisement will be greater than or equal to a specified number of selections.

Solution to Problem

To solve the above problem, the invention according to claim 1 includes estimating means, obtaining means, element determination means, recipient determination means, and delivery control means. An advertisement is delivered to recipients who are determined based on a first limiting element for limiting the recipients, on a specified number of selections until the end of a counting period for counting the number of selections of the advertisement, and on an expected selection rate of the advertisement. The first limiting element and the specified number of selections are included in delivery requirements of the advertisement. The estimating means estimates the number of selections, of the advertisement, to be further needed at the end of the counting period, based on an expected number of selections and an actual number of selections of the advertisement until a time before the end of the counting period. For each of a plurality of second limiting elements that are different from the first limiting element, the obtaining means obtains an actual selection rate of the advertisement by a group, among the recipients of the advertisement, limited by the second limiting element. Based on the actual selection rates obtained by the obtaining means, the element determination means determines a limiting element to be added to the delivery requirements from among the plurality of second limiting elements. Based on the limiting element determined by the element determination means, on the actual selection rate obtained for this limiting element by the obtaining means, and on the number of selections estimated by the estimating means, the recipient determination means determines additional recipients of the advertisement. The delivery control means controls deliveries of the advertisement to the additional recipients determined by the recipient determination means.

According to this invention, the information processing device determines a limiting element to be added to the delivery requirements, based on an actual selection rate of the advertisement by a group limited to by each second limiting element. Based on the determined limiting element, the actual selection rate of the limiting element, and the estimated number of selections, the information processing device also determines additional recipients. The actual selection rate of the limiting element to be added relates to the number of selections through additional deliveries that is expected. Thus, the information processing device can increase the probability that the number of selections to be added will be greater than or equal to the number of selections to be further needed. Consequently, this allows for more efficient deliveries of an advertisement while increasing the probability that the number of selections of the advertisement will be greater than or equal to a specified number of selections.

The invention according to claim 2 is the information processing device according to claim 1 further including number determination means. The number determination means determines the number of limiting elements to be added to the delivery requirements, depending on the number of selections estimated by the estimating means. The element determination means determines the same number of limiting elements as the number determined by the number determination means to be limiting elements to be added to the delivery requirements.

According to this invention, the information processing device adds a different number of limiting elements depending on the number of selections that are estimated to be further needed, thus efficiently limiting additional recipients.

The invention according to claim 3 is the information processing device according to claim 1 or 2 further including adjusting means. The adjusting means adjusts the number of additional deliveries of the advertisement, depending on the remaining time until the end of the counting period. The recipient determination means determines the same number of additional recipients as the number of additional deliveries adjusted by the adjusting means.

According to this invention, the information processing device adjusts the number of additional deliveries depending on the remaining time, thus further increasing the probability that the number of selections to be added will be greater than or equal to the number of selections to be further needed.

The invention according to claim 4 is the information processing device according to any one of claims 1 to 3 in which when deliveries of a second advertisement have been made separately around the same time as those of the advertisement, the estimating means corrects the number of selections to be further needed at the end of the counting period, depending on the deliveries of the second advertisement.

According to this invention, depending on the deliveries of another advertisement that were made around the same time as those of the advertisement to be additionally delivered, the information processing device corrects the number of selections to be further needed, thus properly estimating the number of selections to be further needed.

The invention according to claim 5 is the information processing device according to claim 4 in which when an attribute of an object advertised by the second advertisement is the same as that of an object advertised by the advertisement, the estimating means corrects the number of selections to be further needed at the end of the counting period.

According to this invention, only when an attribute of an object advertised by the other advertisement is the same as that of an object advertised by the advertisement to be additionally delivered, the information processing device can correct the number of selections to be further needed, thus more properly estimating the number of selections to be further needed.

The invention according to claim 6 is an information processing method performed by a computer. The method includes the following steps. An advertisement is delivered to recipients who are determined based on a first limiting element for limiting the recipients, on a specified number of selections until the end of a counting period for counting the number of selections of the advertisement, and on an expected selection rate of the advertisement. The first limiting element and the specified number of selections are included in delivery requirements of the advertisement. The number of selections, of the advertisement, to be further needed at the end of the counting period is estimated, based on an expected number of selections and an actual number of selections of the advertisement until a time before the end of the counting period. For each of a plurality of second limiting elements that are different from the first limiting element, an actual selection rate of the advertisement by a group, among the recipients of the advertisement, limited by the second limiting element is obtained. Based on the obtained actual selection rates, a limiting element to be added to the delivery requirements is determined from among the plurality of second limiting elements. Based on the determined limiting element, on the actual selection rate obtained for this limiting element, and on the estimated number of selections, additional recipients of the advertisement are determined. Deliveries of the advertisement to the determined additional recipients are controlled.

The invention according to claim 7 causes a computer to function as estimating means, obtaining means, element determination means, recipient determination means, and delivery control means. An advertisement is delivered to recipients who are determined based on a first limiting element for limiting the recipients, on a specified number of selections until the end of a counting period for counting the number of selections of the advertisement, and on an expected selection rate of the advertisement. The first limiting element and the specified number of selections are included in delivery requirements of the advertisement. The estimating means estimates the number of selections, of the advertisement, to be further needed at the end of the counting period, based on an expected number of selections and an actual number of selections of the advertisement until a time before the end of the counting period. For each of a plurality of second limiting elements that are different from the first limiting element, the obtaining means obtains an actual selection rate of the advertisement by a group, among the recipients of the advertisement, limited by the second limiting element. Based on the actual selection rates obtained by the obtaining means, the element determination means determines a limiting element to be added to the delivery requirements from among the plurality of second limiting elements. Based on the limiting element determined by the element determination means, on the actual selection rate obtained for this limiting element by the obtaining means, and on the number of selections estimated by the estimating means, the recipient determination means determines additional recipients of the advertisement. The delivery control means controls deliveries of the advertisement to the additional recipients determined by the recipient determination means.

Advantageous Effects of Invention

According to the present invention, the information processing device determines a limiting element to be added to the delivery requirements, based on an actual selection rate of the advertisement by a group limited to by each second limiting element. Based on the determined limiting element, the actual selection rate of the limiting element, and the estimated number of selections, the information processing device also determines additional recipients. The actual selection rate of the limiting element to be added relates to the number of selections through additional deliveries that is expected. Thus, the information processing device can increase the probability that the number of selections to be added will be greater than or equal to the number of selections to be further needed. Consequently, this allows for more efficient deliveries of an advertisement while increasing the probability that the number of selections of the advertisement will be greater than or equal to a specified number of selections.

BRIEF DESCRIPTION OF DRAWINGS

FIG. 1 is a diagram schematically showing an example configuration of an information processing system S according to an embodiment.

FIG. 2A is a block diagram schematically showing an example configuration of an advertisement delivery server 1 according to an embodiment.

FIG. 2B is a diagram showing example functional blocks of a system controller 14 of an advertisement delivery server 1 according to an embodiment.

FIG. 3A is a diagram showing example contents stored in a member information DB 21.

FIG. 3B is a diagram showing example contents stored in a viewing history DB 22.

FIG. 3C is a diagram showing example contents stored in a purchase history DB 23.

FIG. 3D is a diagram showing example contents stored in an advertisement DB 121.

FIG. 3E is a diagram showing example contents included in delivery requirements.

FIG. 3F is a diagram showing example contents stored in an advertisement delivery history DB 122.

FIG. 3G is a diagram showing example contents stored in a click history DB 123.

FIG. 4A is a diagram showing example delivery requirements.

FIG. 4B shows an example of an expected CTR and the number of first deliveries.

FIG. 4C is a diagram showing an example of how to calculate an estimated number of further needed clicks.

FIG. 4D shows an example of information about users who have viewed a web page for an item that has the same attribute as an item to be advertised and users who have not viewed the web page, among users who satisfy recipient requirements.

FIG. 4E shows an example of information about users who have purchased an item that has the same attribute as the item to be advertised and users who have not purchased the item, among the users who satisfy the recipient requirements.

FIG. 5A is a diagram showing example actual CTRs of limiting elements that are candidates for additional requirements.

FIG. 5B is a diagram showing examples of expected numbers of additional clicks corresponding to additional requirements.

FIG. 7A is a flowchart showing an example of an additional delivery control process in the system controller 14 of the advertisement delivery server 1 according to an embodiment.

FIG. 7B is a flowchart showing an example of a further-needed-click-count estimation process in the system controller 14 of the advertisement delivery server 1 according to an embodiment.

FIG. 8 is a flowchart showing an example of an additional requirement/recipient determination process in the system controller 14 of the advertisement delivery server 1 according to an embodiment.

DESCRIPTION OF EMBODIMENTS

Figure 6A:
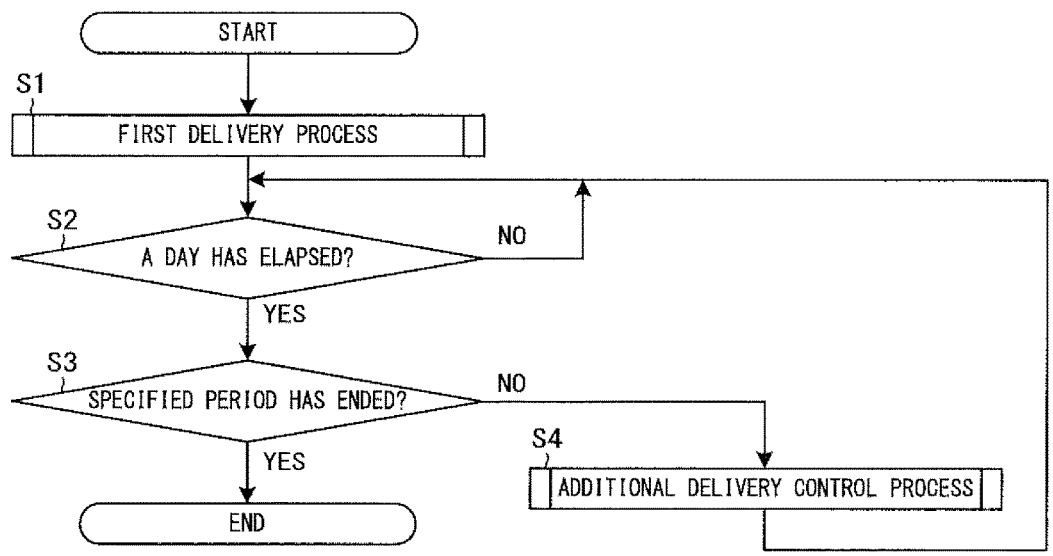
FIG. 6A shows a process overview from the first deliveries of an advertisement to the end of a specified period.

The following describes embodiments of the present invention in detail with reference to the drawings. The embodiments described below are embodiments in which the present invention is applied to an information processing system.

1. First Embodiment 1-1. Configuration and Functional Overview of Information Processing System First, a configuration and a functional overview of an information processing system S according to this embodiment are described with reference to FIG. 1. FIG. 1 is a diagram schematically showing an example configuration of the information processing system S according to this embodiment.

As shown in FIG. 1, the information processing system S includes an advertisement delivery server 1, an online marketplace server 2, a plurality of store terminals 3, and a plurality of user terminals 4. The advertisement delivery server 1 is capable of exchanging data with each store terminal 3 and each user terminal 4 over a network NW using communication protocols, such as TCP/IP. The network NW includes, for example, the Internet, a dedicated communication line (e.g., community antenna television (CATV) line), a mobile communication network (including base stations), and a gateway.

The advertisement delivery server 1 is a server device that delivers advertisements, for example, to users who have signed up for a predetermined online marketplace. The advertisement delivery server 1 is an example of an information processing device according to the present invention. For example, a predetermined deliverer receives a request from an advertiser and registers details of an advertisement, requirements for delivering the advertisement, and other information on the advertisement delivery server 1. The advertisement delivery server 1 determines users to be recipients of the advertisement, based on the registered information, and makes deliveries of the advertisement, for example, as emails. For example, a store in the online marketplace may be the advertiser. Alternatively, for example, a company or a person that does not have any store in the online marketplace may be the advertiser. In the delivered advertisement, for example, a link to a web page of the advertiser is embedded. The web page identified by the link may be, for example, a web page in the online marketplace. Alternatively, the web page identified by the link may be, for example, a web page that displays information about the advertiser or a web page that displays information about an item sold by the advertiser. The advertisement delivery server 1 includes, for example, an advertisement DB 121, an advertisement delivery history DB 122, a click history DB 123, and other databases. The advertisement DB 121 stores, for example, details of advertisements and delivery requirements of the advertisements. The advertisement delivery history DB 122 stores advertisement delivery histories. The click history DB 123 stores users' histories of selecting a link in each advertisement.

The online marketplace server 2 is a server device that performs various processes for the online marketplace. In the online marketplace, a plurality of stores sell items. Users who use the online marketplace can purchase any desired item from any desired store in the online marketplace. For example, the advertisement delivery server 1 sends web pages of the online marketplace and performs processes for item searches and orders, in response to requests from the user terminals 4. The online marketplace server 2 includes, for example, a member information DB 21, a viewing history DB 22, a purchase history DB 23, and other databases. The member information DB 21 stores information about users who have signed up for the online marketplace. The viewing history DB 22 stores web page viewing histories of the users in the online marketplace. The purchase history DB 23 stores item purchase histories of the users in the online marketplace. The advertisement delivery server 1 is capable of accessing the member information DB 21, the viewing history DB 22, and the purchase history DB 23 through the online marketplace server 2.

The store terminal 3 is a terminal device used by, for example, an employee of a store in the online marketplace. Using the store terminal 3, for example, information about items for sale is entered into the online marketplace and item order details are checked. For example, the store may request a deliverer to make deliveries of an advertisement, by email, fax, or regular mail, or may operate the store terminal 3 so that the advertisement delivery server 1 receives a request for deliveries of an advertisement from the store terminal 3.

The user terminal 4 is a terminal device of a user who purchases items from the online marketplace. The user terminal 4 accesses the online marketplace server 2 in accordance with an operation by the user to receive a web page from the online marketplace server 2 and displays the web page. The user terminal 4 has software, such as a browser and an email client, installed on it. For example, a personal computer, a personal digital assistant (PDA), a portable information terminal such as a smartphone, or a mobile phone is used as the user terminal 4.

An advertiser specifies delivery requirements when requesting deliveries of an advertisement. The delivery requirements are requirements for a deliverer to follow in making deliveries of the advertisement. Examples of the delivery requirements include a desired number of clicks, a period, and recipient requirements. The number of clicks is the number of users who clicked a link in a delivered advertisement. Selection of a link in an advertisement is simply referred to as selection of the advertisement. The advertisement delivery server 1 makes simultaneous deliveries of an advertisement, for example, at the beginning of the period specified by the advertiser. The advertisement delivery server 1 counts the number of clicks made from the beginning to the end of the specified period. The specified period is an example of a counting period of the present invention. The desired number of clicks indicates how many clicks the advertiser desires to be made during the period specified by the advertiser. The recipient requirements are requirements about users that the advertiser specifies as recipients of the advertisement. The recipient requirements limit recipients of the advertisement from among the users of the online marketplace. Examples of an element item that can be specified in the recipient requirements include gender, age groups, areas of residence, member ranks, a web page viewing history, an item purchase history, and a delivered advertisement reception history. An element that can be specified in the recipient requirements is referred to as a "limiting element". From among users who satisfy the recipient requirements, the advertisement delivery server 1 determines such many users as are expected to raise the number of clicks during the specified period to at least the desired number of clicks to be recipients of the advertisement, and makes deliveries of the advertisement. Deliveries of an advertisement that are made for the first time are referred to as the first deliveries. The number of recipient users is referred to as the number of deliveries. As the number of deliveries increases, the number of clicks can be expected to increase. However, the number of clicks to be made during the period need not be excessively large as compared to the desired number of clicks. The reason is that the number of clicks that is at least equal to the desired number of clicks can satisfy the advertiser's desire. If an excessively large number of deliveries cause an excessively large number of clicks compared to the desired number of clicks, the number of deliveries relative to the desired number of clicks becomes large. This means that efficiency in deliveries of the advertisement is reduced and that the processing load of the advertisement delivery server 1 is unnecessarily increased. Thus, the advertisement delivery server 1 determines the number of deliveries, for example, so that the number of clicks is as close as possible to the desired number of clicks.

There may be a case where after the first deliveries, the actual number of clicks at a time before the end of the period is not as many as an expected number of clicks. In this case, the number of clicks at the end of the period is likely to fall short of the desired number of clicks. In such a case, the advertisement delivery server 1 performs additional deliveries of the advertisement. At this time, the advertisement delivery server 1 determines additional recipients so that the expected number of clicks at the end of the period is greater than or equal to the desired number of clicks, so that the expected number of clicks is as close as possible to the desired number of clicks, and so that efficiency in deliveries of the advertisement increases. How to determine the additional recipients will be described later.

1-2. Database Structures of Online Marketplace Server

The following describes database structures that the online marketplace server 2 has, with reference to FIGS. 3A to 3C. FIG. 3A is a diagram showing example contents stored in the member information DB 21. The member information DB 21 stores member information about users who have signed up for the online marketplace. Specifically, the member information DB 21 stores, for each user, the user's user ID, password, nickname, name, member rank, birth date, age group, gender, zip code, address, area of residence, telephone number, email address, and other user attributes in association with each other. The user ID is identification information of the user. The member rank is a rank that is assigned to the user based on his or her online marketplace usage pattern. A user assigned a higher rank can receive preferential treatment in using the online marketplace. The area of residence indicates the area where the user lives. For example, the area of residence may be a prefecture, a district, or a country.

FIG. 3B is a diagram showing example contents stored in the viewing history DB 22. The viewing history DB 22 stores viewing histories. Specifically, every time a web page is viewed, for example, a user ID, a viewed date and time, and a URL are stored in association with each other in the viewing history DB 22. The user ID indicates the user who viewed the web page. The viewed date and time indicates the date and time at which the web page was viewed. The URL indicates the viewed web page. The advertisement delivery server 1 is capable of identifying a store and an item about which information is displayed on the web page, from the URL of the web page.

FIG. 3C is a diagram showing example contents stored in the purchase history DB 23. The purchase history DB 23 stores purchase histories. Specifically, every time an item is purchased, for example, an order number, an order date and time, a user ID, a store ID, an item ID, a product code, a category ID, and a unit price are stored in association with each other in the purchase history DB 23. The order number is an identification number that is assigned to an item order. The order date and time indicates the date and time at which the item was ordered. The user ID indicates the user who purchased the item. The store ID is identification information of the store that sold the purchased item. The item ID is identification information that the store assigned to the item. The product code is a code number identifying the item. Examples of the product code include a Japanese article number (JAN) code. The item ID and the product code indicate the purchased item. The category ID is identification information of a category to which the purchased item belongs.

1-3. Configuration of Advertisement Delivery Server

The following describes a configuration of the advertisement delivery server 1 with reference to FIGS. 2A and 3D to 3F. FIG. 2A is a block diagram schematically showing an example configuration of the advertisement delivery server 1 according to this embodiment. As shown in FIG. 2A, the advertisement delivery server 1 includes a communication unit 11, a storage unit 12, an input/output interface 13, and a system controller 14. The system controller 14 and the input/output interface 13 are connected via a system bus 15.

The communication unit 11 connects to the network NW and controls the state of communications with the store terminals 3, the user terminals 4, and the like.

The storage unit 12 includes, for example, hard disk drives. In this storage unit 12, the advertisement DB 121, the advertisement delivery history 122, the click history DB 123, and other databases are created.

FIG. 3D is a diagram showing example contents stored in the advertisement DB 121. As shown in FIG. 3D, the advertisement DB 121 stores, for each advertisement whose deliveries were requested by an advertiser, an advertisement ID, a store ID, an item ID, a product code, a category ID, advertisement content, delivery requirements, and other information in association with each other. The advertisement ID is identification information of the advertisement. The store ID indicates the store that is the advertiser. The item ID and the product code indicate an item to be advertised. The advertisement content is content of the advertisement output to user terminals 4. For example, the advertisement content may include at least one of characters, an image, a moving image, and a sound. The advertisement content also includes the URL of a web page indicated by a link displayed in the advertisement.

FIG. 3E is a diagram showing example contents included in the delivery requirements. As shown in FIG. 3E, the delivery requirements include a desired number of clicks, a specified period, and one or more recipient requirements. As described above, examples of a limiting element that can be specified as a recipient requirement include gender, age groups, areas of residence, member ranks, a web page viewing history, an item purchase history, a delivered advertisement reception history. Examples of a limiting element related to the web page viewing history include whether, how many times, how often, and when a web page was viewed. A web page to be viewed may not be specified. Alternatively, a web page for a specific item, an item belonging to a specific category, an item with a specific attribute, or the like may be specified. Examples of a limiting element related to the item purchase history include whether, how many times, how often, and when an item was purchased. An item to be purchased may not be specified. Alternatively, a specific item, an item belonging to a specific category, an item with a specific attribute, or the like may be specified. Examples of a limiting element related to a user's history of receiving delivery of an advertisement include whether, how many times, how often, and when the advertisement was delivered. An item advertised by the delivered advertisement may not be specified. Alternatively, a specific item, an item belonging to a specific category, an item with a specific attribute, or the like may be specified.

FIG. 3F is a diagram showing example contents stored in the advertisement delivery history DB 122. The advertisement delivery history DB 122 stores advertisement delivery histories. Specifically, every time deliveries of an advertisement are made, for example, an advertisement ID, a delivery date and time, the number of deliveries, and a recipient list are stored in association with each other in the advertisement DB 122. The advertisement ID indicates the delivered advertisement. The delivery date and time indicates the date and time at which the advertisement was delivered. The number of deliveries is the number of recipient users of the advertisement. The recipient list is a list of the recipient users of the advertisement.

FIG. 3G is a diagram showing example contents stored in the click history DB 123. The click history DB 123 stores click histories. Specifically, every time an advertisement is selected, for example, an advertisement ID, a user ID, and a click date and time are stored in association with each other in the click history DB 123. The advertisement ID indicates the advertisement in which a link was selected. The user ID indicates the user who selected the link. The click date and time indicates the date and time at which the link was selected. The URL in a link included in an advertisement delivered by the advertisement delivery server 1 has been converted into, for example, a URL of the advertisement delivery server 1. This URL includes, for example, an advertisement ID and information identifying the web page originally identified by the link. When a user selects the advertisement, the user terminal 4 sends the URL in the link to the advertisement delivery server 1. In response to this, the advertisement delivery server 1 registers a click log. The advertisement delivery server 1 then returns the URL of the web page originally identified by the link to the user terminal 4, for example, using an HTTP redirection. The user terminal 4, which has received the URL, accesses the web page originally identified by the link.

The storage unit 12 stores various setting values. The storage unit 12 also stores various programs, such as an operating system, a World Wide Web (WWW) server program, a database management system (DBMS), and an advertisement delivery program. The advertisement delivery program is an example of an information processing program according to the present invention. The advertisement delivery program is a program for performing various processes related to advertisement deliveries. The various programs may be available from, for example, another server device over the network NW, or may be recorded in a recording medium, such as an optical disk, and be read via a drive device. The advertisement delivery program may be a program product.

The input/output interface 13 performs interface processing between the communication unit 11 and the storage unit 12, and the system controller 14.

The system controller 14 includes, for example, a CPU 14a, a read only memory (ROM) 14b, and a random access memory (RAM) 14c. The CPU 14a is an example of a processor. The present invention can also be applied to various processors that differ from CPUs. The storage unit 12, the ROM 14b, and the RAM 14c are each an example of a memory. The present invention can also be applied to various memories that differ from hard disks, ROMs, and RAMs.

The advertisement delivery server 1 may include a plurality of server devices. For example, a server device that determines recipients of an advertisement, a server device that makes deliveries of the advertisement, a server device that manages databases, and other server devices may be connected to each other via a LAN or the like.

1-4. Functional Overview of System Controller

The following describes a functional overview of the system controller 14 with reference to FIGS. 2B and 4A to 5B. FIG. 23B is a diagram showing example functional blocks of the system controller 14 of the online marketplace server 1 according to this embodiment. As shown in FIG. 2B, the advertisement delivery program and other programs, which are read and executed by the CPU 14a, enable the system controller 14 to function as, for example, a first delivery controller 141, an additional delivery determiner 142, a further-needed-click-count estimator 143, an adding unit 144, and an additional delivery controller 145. The further-needed-click-count estimator 143 is an example of estimating means of the present invention. The adding unit 144 is an example of obtaining means, element determination means, and recipient determination means of the present invention. The additional delivery controller 145 is an example of delivery control means of the present invention.

The first delivery controller 141 makes the first deliveries of an advertisement. The first delivery controller 141 determines recipients of the advertisement, based on delivery requirements. First, the first delivery controller 141 obtains an expected click-through rate (CTR) corresponding to the length of a specified period. A CTR is the ratio of the number of users who selected an advertisement to the number of users who received deliver of the advertisement. Thus, the CTR is calculated by dividing the number of clicks by the number of deliveries. An expected CTR corresponding to the length of a specified period is an expected CTR until the time when the specified period has elapsed since deliveries of an advertisement were made. The expected CTR is an example of an expected selection rate. For example, an expected CTR may be prestored for each number of days in the storage unit 12. For example, an administrator of the advertisement delivery server 1 may set the expected CTR. Alternatively, for example, the system controller 14 may calculate the expected CTR, based on the advertisement delivery histories and the click histories. Alternatively, for example, an expected CTR may be set for each item category. In this case, the first delivery controller 141 may retrieve the expected CTR corresponding to a category of an item to be advertised.

The first delivery controller 141 divides the desired number of clicks included in the delivery requirements by the expected CTR corresponding to the length of the specified period, to calculate the number of first deliveries. The first delivery controller 141 also extracts users who satisfy all recipient requirements from among the users of the online marketplace. From among the extracted users, the first delivery controller 141 determines the same number of users as the number of first deliveries to be first recipients. If the number of users who satisfy all the recipient requirements is greater than the number of first deliveries, the first delivery controller 141 may, for example, randomly determine the first recipients from among the users who satisfy all the recipient requirements. The first delivery controller 141 may increase the number of first deliveries, which is calculated, for example, based on the expected CTR and the desired number of clicks, by a predetermined percentage or by a predetermined number.

The following describes a specific example. FIG. 4A is a diagram showing example delivery requirements. For example, assume that the desired number of clicks is 30,000 and that the length of the specified period is seven days. Also assume that the recipient requirements are that a recipient is a woman in her thirties and that her area of residence is Kanto. FIG. 4B shows an example of an expected CTR and the number of first deliveries. For example, assume that an expected CTR for seven days is 0.03. In this case, the number of first deliveries is one million. For example, when the number of users who are women in their thirties and whose area of residence is Kanto is two million, the first delivery controller 141 makes deliveries of an advertisement to one million of the users.

After the first deliveries, the additional delivery determiner 142 determines whether to make additional deliveries of the advertisement at a time before the end of the specified period. The additional delivery determiner 142 may perform the determination, for example, at predetermined intervals. The interval between the determinations may be, for example, a predetermined time, a day, a predetermined number of days, or a week. In this embodiment, the description assumes that the determination is performed at daily intervals.

With each passing day, the additional delivery determiner 142 calculates an expected number of clicks corresponding to each number of days that have elapsed since the beginning of the specified period, for example, based on the desired number of clicks included in the delivery requirements. An expected number of clicks is an example of an expected number of selections of the present invention. The expected number of clicks is the number of clicks that is expected at a time before the end of the specified period, on the assumption that the number of clicks at the end of the specified period reaches the desired number of clicks. To calculate the expected number of clicks, the additional delivery determiner 142 obtains an expected achievement rate for each elapse day. The expected achievement rate is the percentage of the number of clicks expected until a time before the end of the specified period, on the assumption that the percentage of the number of clicks at the end of the specified period is 100%. For example, an expected achievement rate may be prestored for each number of days in the storage unit 12. For example, the expected achievement rate may be set or calculated in the same manner as the expected CTR. The additional delivery determiner 142 multiplies the desired number of clicks by the expected achievement rate corresponding to the number of elapsed days between the beginning of the specified period and the current time, to calculate the expected number of clicks.

The additional delivery determiner 142 also obtains the actual number of clicks made from the beginning of the specified period to the current time. An actual number of clicks is an example of an actual number of selections of the present invention. The actual number of clicks is the number of clicks actually made. For example, the additional delivery determiner 142 can calculate the actual number of clicks, based on the click histories. If the actual number of clicks is less than the expected number of clicks, the additional delivery determiner 142 determines that additional deliveries should be made.

If it is determined that additional deliveries should be made, the further-needed-click-count estimator 143 estimates how many more clicks will be needed at the end of the specified period. The number of further needed clicks indicates how many clicks less than the desired number of clicks the number of clicks that are made until the end of the specified period is. The number of clicks that are estimated to be further needed is referred to as an estimated number of further needed clicks. For example, the further-needed-click-count estimator 143 may subtract the actual number of clicks from the expected number of clicks to calculate the current number of further needed clicks, and may divide this number of further needed clicks by the expected achievement rate corresponding to the current time to calculate the estimated number of further needed clicks.

The following describes a specific example. FIG. 4C is a diagram showing an example of how to calculate the estimated number of further needed clicks. Assume that the first delivery controller 141 makes deliveries of an advertisement in accordance with the delivery requirements shown in FIG. 4A and the conditions shown in FIG. 4B. The expected achievement rate at the time when one day has elapsed since the beginning of the specified period is 0.5. Thus, the corresponding expected number of clicks is 15,000. Also assume that the corresponding actual number of clicks is 16,000. In this case, additional deliveries are not made. The expected achievement rate at the time when two days have elapsed since the beginning of the specified period is 0.75. Thus, the corresponding expected number of clicks is 22,500. Also assume that the corresponding actual number of clicks is 20,250. In this case, the additional delivery determiner 142 determines that additional deliveries should be made. The further-needed-click-count estimator 143 divides the current number of further needed clicks 2,250 by the corresponding expected achievement rate 0.75, and thus calculates the estimated number of further needed clicks to be 3,000.

The adding unit 144 determines an additional requirement for determining additional recipients, from among limiting elements that differ from any of the recipient requirements. The additional requirement is a limiting element to be added to the recipient requirements. Specifically, users who satisfy the additional requirement as well as the recipient requirements are determined to be the additional recipients. This means that the limiting elements are added to the recipient requirements. To do this, the adding unit 144 obtains an actual CTR of each of the limiting elements. An actual CTR indicates the ratio of the number of users who actually selected an advertisement before a time within the specified period to the number of users who received deliver of the advertisement. The actual CTR is an example of an actual selection rate of the present invention. Some of the users who are the first recipients may satisfy requirements indicated by the limiting elements that differ from the recipient requirements. For example, as shown in FIG. 4A, when the recipient requirements are that a recipient is a woman in her thirties and that her area of residence is Kanto, some of the users who satisfy these recipient requirements may have purchased an item, and the other may not have purchased the item. Thus, the adding unit 144 obtains, for each limiting element, the ratio of the number of users who selected the advertisement to the number of users who satisfy a requirement of the limiting element as an actual CTR and who are the first recipients. For example, the adding unit 144 can calculate the actual CTRs, based on of the recipient lists of the advertisement delivery histories and the click histories.

After obtaining the actual CTRs, the adding unit 144 determines an additional requirement, based on the actual CTRs. For example, from among a plurality of limiting elements, the adding unit 144 may determine a limiting element that has the highest actual CTR to be an additional requirement. The reason is that additional deliveries of the advertisement to users who satisfy a requirement of a limiting element with a high actual CTR can be expected to allow a relatively large number of clicks to be made with a relatively small number of additional deliveries. That is, the advertisement delivery server 1 can efficiently makes additional deliveries.

After determining an additional requirement, the adding unit 144 determines additional recipients, based on the additional requirement, the actual CTR corresponding to the additional requirement, and the estimated number of further needed clicks. For example, the adding unit 144 may determine the number of additional deliveries. For example, the adding unit 144 calculates an expected CTR in the remaining days until the end of the specified period by users who satisfy all of the recipient requirements and the additional requirement. For example, the adding unit 144 divides the actual CTR corresponding to the additional requirement by the expected achievement rate at the current time, to calculate an expected CTR corresponding to the length of the specified period. Subsequently, the adding unit 144 obtains an expected achievement rate corresponding to the remaining number of days between the current time and the end of the specified period. Then, the adding unit 144 multiplies the expected CTR corresponding to the length of the specified period by the expected achievement rate corresponds to the remaining number of days, to calculate the expected CTR until the end of the specified period. The adding unit 144 divides the estimated number of further needed clicks by the expected CTR to calculate the number of additional deliveries. From among users who satisfy all of the recipient requirements and the additional requirement and who are not the first recipients, the adding unit 144 determines the same number of users as the number of additional deliveries to be the additional recipients. Alternatively, for example, the adding unit 144 may determine a larger number of users than the number of additional deliveries by a predetermined percentage to be the additional recipients, or may determine a larger number of users than the number of additional deliveries by a predetermined number to be the additional recipients.

The following shows a specific example. Assume that the first delivery controller 141 makes first deliveries in accordance with the requirements shown in FIG. 4A and the conditions shown in FIG. 4B and that as shown in FIG. 4C, two days later, the additional delivery determiner 142 determines that additional deliveries should be made. FIG. 4D shows an example of information about users who have viewed a web page for an item that has the same attribute as an item to be advertised and users who have not viewed the web page, among users who satisfy the recipient requirements. As shown in FIG. 4D, the actual CTR two days later of the users who have viewed the specific web page is 0.05, and the actual CTR two days later of the users who have not viewed the specific web page is 0.01. FIG. 4E shows an example of information about users who have purchased an item that has the same attribute as the item to be advertised and users who have not purchased the item, among the users who satisfy the recipient requirements. As shown in FIG. 4E, the actual CTR two days later of the users who have purchased the specific item is 0.03, and the actual CTR two days later of the users who have not purchased the specific item is 0.02. Thus, the adding unit 144 determines a limiting element of having viewed the specific web page to be an additional requirement. As shown in FIG. 4C, the expected achievement rate two days later is 0.75, and the expected achievement rate five days later is 0.975. Therefore, the expected CTR of the additional requirement between two days later and the end of the specified period is 0.065. The estimated number of further needed clicks is 3,000, and therefore the number of additional deliveries is 46,154. The number of users who satisfy all of the recipient requirements and the additional requirement and who are not the first recipients is 78,000. Therefore, the advertisement delivery server 1 only needs to make additional deliveries of the advertisement to 46,154 of these users. Users who are not first recipients are referred to as unrecipient users.

When additional deliveries are made to all unrecipient users who satisfy all of the recipient requirements and the additional requirement as additional recipients, the number of clicks that are expected to be made by these users in the remaining days until the end of the specified period is referred to as an expected number of additional clicks. This expected number of additional clicks may far exceed the estimated number of further needed clicks. For example, as shown in FIG. 4C, the number of unrecipient users who satisfy the recipient requirements and who have viewed the specific web page is 78,000. Therefore, the expected number of additional clicks is 5,070 when the advertisement delivery server 1 makes additional deliveries of the advertisement to all these users. For example, if the expected number of additional clicks is greater than or equal to the estimated number of further needed clicks by a predetermined percentage or by a predetermined number, the adding unit 144 may further determine another additional requirement. The adding unit 144 may then determine additional recipients from among unrecipient users who satisfy all of the recipient requirements, the first determined additional requirement, and the further determined additional requirement. This enables the number of candidates for the additional recipients to be closer to the estimated number of further needed clicks. For example, from among limiting elements that differ from any of the recipient requirements and the limiting elements determined to be the additional requirements before, the adding unit 144 may determine a limiting element that has the highest actual CTR to be an additional requirement. Narrowing additional recipients in accordance with a plurality of additional requirements that have high actual CTRs increases the probability that the advertisement delivery server 1 more efficiently makes additional deliveries.

In this case, it is possible that the additional requirements have a hierarchical structure. For example, assume that the first determined additional requirement is the top-level additional requirement. Assume that the level of this additional requirement is 1. Assume that the further determined additional requirement is an additional requirement that is one level lower. Assume that the level of this additional requirement is 2. If the third additional requirement is determined, the level of this additional requirement is 3. Until the situation that the expected number of clicks, which is calculated based on the number of users who satisfy all of the all levels of additional requirements determined before, is greater than or equal to the estimated number of further needed clicks by a predetermined percentage or by a predetermined number becomes resolved, the adding unit 144 may recursively determine another additional requirement.

The adding unit 144 may determine additional requirements whose level is 2 or lower, for example, using the first determined actual CTR. Alternatively, for example, the adding unit 144 may recalculate the actual CTR of each additional requirement, based on the click histories of users who are the first recipients and who satisfy all levels of additional requirements determined before. The adding unit 144 may then determine lower levels of additional requirements using the recalculated actual CTRs.

The adding unit 144 may calculate the expected number of clicks of users who satisfy all levels of additional requirements determined before, for example, using the actual CTR of the level-1 additional requirement, using the actual CTR of the bottom-level additional requirement, or using the actual CTRs recalculated in the above way.

The following shows a specific example. For example, assume that the estimated number of further needed clicks is 3,000 and that a further additional requirement is determined when the expected number of additional clicks is greater than 1.05 times the estimated number of further needed clicks. That is, when the expected number of additional clicks is greater than or equal to 3,150, a further additional requirement is determined. FIG. 5A is a diagram showing example actual CTRs of limiting elements that are candidates for additional requirements. As shown in FIG. 5A, for example, there are A-1, A-2, B-1 to B-3, C-1, C-2, D-1, and D-2 as candidates for additional requirements. Limiting elements whose names begin with the same alphabet are limiting elements with the same element item. For example, the limiting elements B-1 to B-3 have the same element item. Limiting elements with the same element item are mutually exclusive. For example, the limiting element of woman and the limiting element of man are limiting elements with the element item of gender. There is no man in woman, and there is no woman in man. The limiting element that has the highest actual CTR among the limiting elements shown in FIG. 5A is A-1. Thus, the adding unit 144 determines the limiting element A-1 to be the level-1 additional requirement. FIG. 5B is a diagram showing examples of expected numbers of additional clicks corresponding to additional requirements. The expected number of additional clicks when the additional requirement is A-1 is 6,000. Thus, the adding unit 144 determines a further additional requirement. The limiting element that has the second highest actual CTR is C-1. Thus, the adding unit 144 determines the limiting element C-1 to be the level-2 additional requirement. The adding unit 144 counts the number of unrecipient users who satisfy all the limiting elements A-1 and C-1. The adding unit 144 then calculates the expected number of additional clicks, based on the calculate number of users. The expected number of additional clicks when the additional requirements are A-1 and C-1 is 4,000. Thus, the adding unit 144 determines a further additional requirement. The limiting element that has the third highest actual CTR is C-2. However, the limiting element C-2 and the limiting element C-1 determined to be the additional requirement are mutually exclusive. Thus, the adding unit 144 rules out the limiting element C-2 as an additional requirement. The limiting element that has the fourth highest actual CTR is B-2. Thus, the adding unit 144 determines the limiting element B-2 to be the level-3 additional requirement. The expected number of additional clicks when the additional requirements are A-1, C-1, and B-2 is 3,100. Therefore, the additional requirements are finally settled.

There may be a case where the expected number of additional clicks corresponding to the determined additional requirements is less than the estimated number of further needed clicks. In this case, the adding unit 144 may further determine another additional requirement, for example, so that users except users who satisfy the determined additional requirements are also determined to be additional recipients. The level of the additional requirement determined here is the same as that of the additional requirement previously determined. For example, assume that the expected number of additional clicks when the level-1 additional requirement is A-1 is 2,500. Thus, the adding unit 144 determines the limiting element C-1 that has the second highest actual CTR to be a further level-1 additional requirement. The adding unit 144 extracts user who satisfy the limiting element C-1, from among unrecipient users who do not satisfy the limiting element A-1. The adding unit 144 then calculates the expected number of additional clicks corresponding to the limiting element C-1, based on the number of the extracted users and the actual CTR of the limiting element C-1. For example, assume that the expected number of additional clicks corresponding to the limiting element C-1 is 500. The sum of the expected number of additional clicks corresponding to the limiting element A-1 and the expected number of additional clicks corresponding to the limiting element C-1 is 3,000. Therefore, the additional requirements are finally settled. In this case, the advertisement delivery server 1 makes deliveries of the advertisement to users who satisfy at least either the limiting element A-1 or C-1, among the users who satisfy the recipient requirements.

When determining the same level of additional requirements and then determining a lower level of additional requirement, the adding unit 144 may determine, for example, users who satisfy one of the additional requirements except the last determined one of the upper level of additional requirements to be additional recipients. The adding unit 144 may then determine the lower level of additional requirement using only the last determined additional requirement as an upper level of additional requirement. The reason is that the expected number of clicks based on the number of users who satisfy one of the additional requirements except the last determined additional requirement is less than the estimated number of further needed clicks. For example, assume that the adding unit 144 first determines A-1 to be a level-1 additional requirement. Also assume that the adding unit 144 further determines B-1 to be a level-1 additional requirement because the expected number of clicks of the additional requirement A-1 is 2,500 and the estimated number of further needed clicks is 3,000. Also assume that the expected number of clicks of the additional requirement B-1 is 2,000. In this case, the adding unit 144 determines users who satisfy the additional requirement A-1 to be additional recipients, thus ensuring 2,500 expected clicks. The adding unit 144 then determines a lower level of additional requirement to further narrow users who satisfy the additional requirement B-1, accordingly bringing the expected number of clicks corresponding to the additional requirement B-1, 2,000, close to 500, which is the difference between the expected number of clicks of the additional requirement A-1, 2,500, and the estimated number of further needed clicks, 3000.

The additional delivery controller 145 controls deliveries of the advertisement to the recipients determined by the adding unit 144. For example, the additional delivery controller 145 retrieves the email addresses of the recipient users from the member information DB 21 and sends each advertisement by email.

1-5. How Information Processing System Works

The following describes how the information processing system S works, with reference to FIGS. 6A to and 9. FIG. 6A is a flowchart showing an example process in the system controller 14 of the advertisement delivery server 1 according to this embodiment. FIG. 6A shows a process overview from the first deliveries of an advertisement to the end of a specified period. When it is determined based on a stored specified period that there is an advertisement whose specified period has begun, the system controller 14 retrieves the advertisement ID of the advertisement from the advertisement DB 121. The system controller 14 then performs a first delivery process as shown in FIG. 6A (Step S1). In the first delivery process, the system controller 14 makes the first deliveries of the advertisement. Subsequently, the system controller 14 determines whether a day has elapsed since the first delivery process was performed (Step S2). If the system controller 14 determines that a day has not elapsed (NO in Step S2), Step S2 is performed again a predetermined time later. On the other hand, if the system controller 14 determines that a day has elapsed (YES in Step S2), the process proceeds to Step S3. In Step S3, the system controller 14 determines whether the specified period has ended. If the system controller 14 determines that the specified period has not ended (NO in Step S3), the process proceeds to Step S4. In Step S4, the system controller 14 performs an additional delivery control process. In the additional delivery control process, the system controller 14 determines whether to make additional deliveries and makes additional deliveries of the advertisement based on the determination result. Subsequently, the process proceeds to Step S2, and the system controller 14 determines whether a day has elapsed since the additional delivery control process was performed. If a day has elapsed, the process proceeds to Step S3. If the system controller 14 determines in Step S3 that the specified period has ended, the process shown in FIG. 6A is terminated.

Figure 6B:
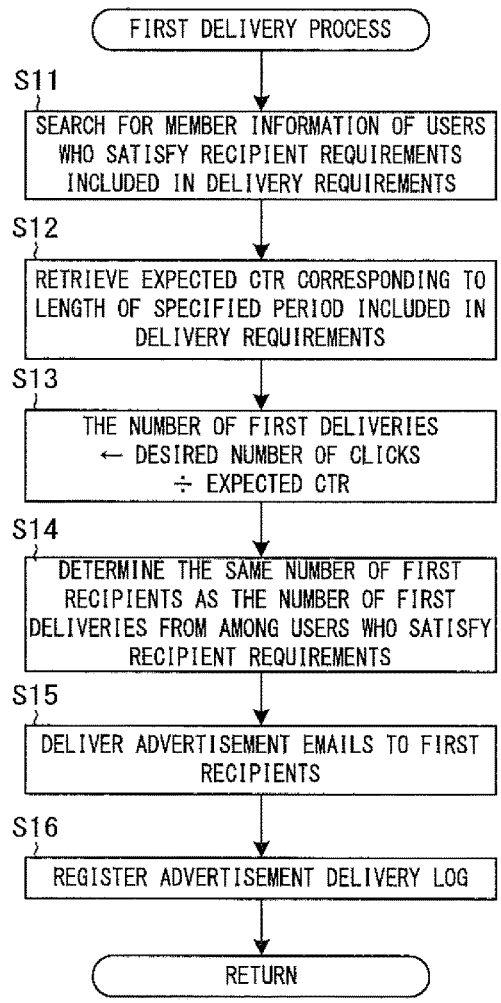
FIG. 6B is a flowchart showing an example of a first delivery process in the system controller 14 of the advertisement delivery server 1 according to an embodiment.

FIG. 6B is a flowchart showing an example of the first delivery process in the system controller 14 of the advertisement delivery server 1 according to this embodiment. As shown in FIG. 6B, the first delivery controller 141 extracts users who satisfy recipient requirements, from among the users of the online marketplace (Step S11). Specifically, the first delivery controller 141 extracts the user IDs of users who satisfy the recipient requirements from the member information DB 21, based on the member ranks, the gender, the age, and the areas of residence stored in the member information DB 21, the viewing history DB 22, the purchase history DB 23, the advertisement delivery history DB 122, and other information. Subsequently, the first delivery controller 141 retrieves the expected CTR corresponding to the length of the specified period included in the delivery requirements from the storage unit 12 (Step S12). Then, the first delivery controller 141 divides a desired number of clicks included in the delivery requirements by the expected CTR to determine the number of first deliveries (Step S13). Next, from among the extracted users, the first delivery controller 141 determines the same number of users as the number of first deliveries to be first recipients (Step S14). In this step, the first delivery controller 141 generates a recipient list that stores the user IDs of the users who are the first recipients. Subsequently, the first delivery controller 141 makes deliveries of the advertisement to the determined first recipients (Step S15). Specifically, the first delivery controller 141 generates advertisement emails, based on advertisement content stored in the advertisement DB 121. The first delivery controller 141 also retrieves the email addresses corresponding to the user IDs stored in the recipient list from the member information DB 21, and sets the email addresses to the address fields of the emails. The first delivery controller 141 then sends the generated emails to the recipient users. Subsequently, the first delivery controller 141 registers an advertisement delivery log (Step S16). Specifically, the first delivery controller 141 obtains the current date and time as the delivery date and time. The first delivery controller 141 then stores the delivery date and time, a delivery number, the number of first deliveries, and the recipient list in association with the advertisement ID in the advertisement delivery history DB 122. After Step S16, the first delivery controller 141 terminates the first delivery process.

FIG. 7A is a flowchart showing an example of the additional delivery control process in the system controller 14 of the advertisement delivery server 1 according to this embodiment. As shown in FIG. 7A, the additional delivery determiner 142 obtains the actual number of clicks until the current time (Step S21). Specifically, the additional delivery determiner 142 counts the number of click logs corresponding to the advertisement ID of the target advertisement, in the click histories stored in the click history DB 123, as the actual number of clicks. In this step, the additional delivery determiner 142 counts a plurality of link selections by the same user as one selection. Subsequently, the additional delivery determiner 142 retrieves the expected achievement rate corresponding to the number of days between the beginning of the specified period and the current time from the storage unit 12 (Step S22). Next, the additional delivery determiner 142 retrieves the number of first deliveries corresponding to the advertisement ID of the target advertisement from the advertisement delivery history DB 122. Then, the additional delivery determiner 142 multiplies the number of first deliveries by the expected achievement rate to calculate an expected number of clicks at the current time (Step S23). After that, the additional delivery determiner 142 determines whether the actual number of clicks is less than the expected number of clicks (Step S24). If the additional delivery determiner 142 determines that the actual number of clicks is not less than the expected number of clicks (NO in Step S24), the additional delivery control process is terminated. On the other hand, if the additional delivery determiner 142 determines that the actual number of clicks is less than the expected number of clicks (YES in Step S24), the process proceeds to Step S25. In Step S25, the further-needed-click-count estimator 143 performs a further-needed-click-count estimation process.

FIG. 7B is a flowchart showing an example of the further-needed-click-count estimation process in the system controller 14 of the advertisement delivery server 1 according to this embodiment. As shown in FIG. 7B, the further-needed-click-count estimator 143 subtracts the actual number of clicks from the expected number of clicks, to calculate the current number of further needed clicks at the current time. The further-needed-click-count estimator 143 then divides the number of further needed clicks by the expected achievement rate at the current time, to calculate an estimated number of further needed clicks (Step S41). After Step S41, the further-needed-click-count estimator 143 terminates the further-needed-click-count estimation process.

After the further-needed-click-count estimation process, as shown in FIG. 7A, the adding unit 144 sets a target number of additional clicks to the estimated number of further needed clicks (Step S26). Next, the adding unit 144 performs an additional requirement/recipient determination process (Step S27).

FIG. 8 is a flowchart showing an example of the additional requirement/recipient determination process in the system controller 14 of the advertisement delivery server 1 according to this embodiment. As shown in FIG. 8, the adding unit 144 calculates the current actual CTR for each limiting element that differs from any of the recipient requirements (Step S51). Specifically, the adding unit 144 retrieves the recipient list corresponding to the advertisement ID of the advertisement to be additionally delivered from the advertisement delivery history DB 122. Based on the recipient list, the adding unit 144 extracts, for each limiting element that differs from any of the recipient requirements, a group of users who satisfy the limiting element, from among the users who are the first recipients and the users who were determined to be the additional recipients before. For example, the adding unit 144 can extract users who satisfy the limiting element, based on what the member information corresponding to the user ID of each recipient user contains, whether there is a viewing history, a purchase history, and an advertisement delivery history corresponding to the user ID, or what those histories contain. The adding unit 144 counts, for each limiting element, the number of users who satisfy the limiting element. A limiting element that no user satisfies is ruled out as a candidate additional requirement. The adding unit 144 calculates, for each limiting element, the number of users who selected the target advertisement, by searching the click history DB 123 for the user IDs of users who satisfy the limiting element and the click history corresponding to the advertisement ID of the advertisement. The adding unit 144 then divides the number of users who selected the advertisement to be additionally delivered by the number of users who satisfy the limiting element, to calculate the actual CTR.

Subsequently, the adding unit 144 extracts unrecipient users (Step S52). Specifically, the adding unit 144 extracts users who satisfy the recipient requirements from among the users of the online marketplace. The adding unit 144 then extracts users, as unrecipient users, who are neither the first recipients nor the past additional recipients, from among the users who satisfy the recipient requirements based on the recipient list retrieved in Step S51.

Subsequently, the adding unit 144 retrieves, from the storage unit 12, the expected achievement rate corresponding to the number of elapsed days between the beginning of the specified period and the current time and the expected achievement rate corresponding to the remaining number of days from the current time to the end of the specified period. The adding unit 144 then divides the expected achievement rate corresponding to the remaining number of days by the expected achievement rate corresponding to the number of elapsed days until the current time, to calculate a CTR ratio (Step S53). Next, the adding unit 144 sets an expected number of additional clicks to 0 and sets a level L to 0 (Step S54). The adding unit 144 also initializes an additional recipient list. After that, from among limiting elements that differ from any of the recipient requirements, the adding unit 144 determines a limiting element that has the highest actual CTR to be an additional requirement (Step S55). In this step, the adding unit 144 determines the additional requirement from among limiting elements that do not have an exclusive relationship with the recipient requirements. Next, the adding unit 144 performs a recursive determination process (Step S56).

Figure 9:
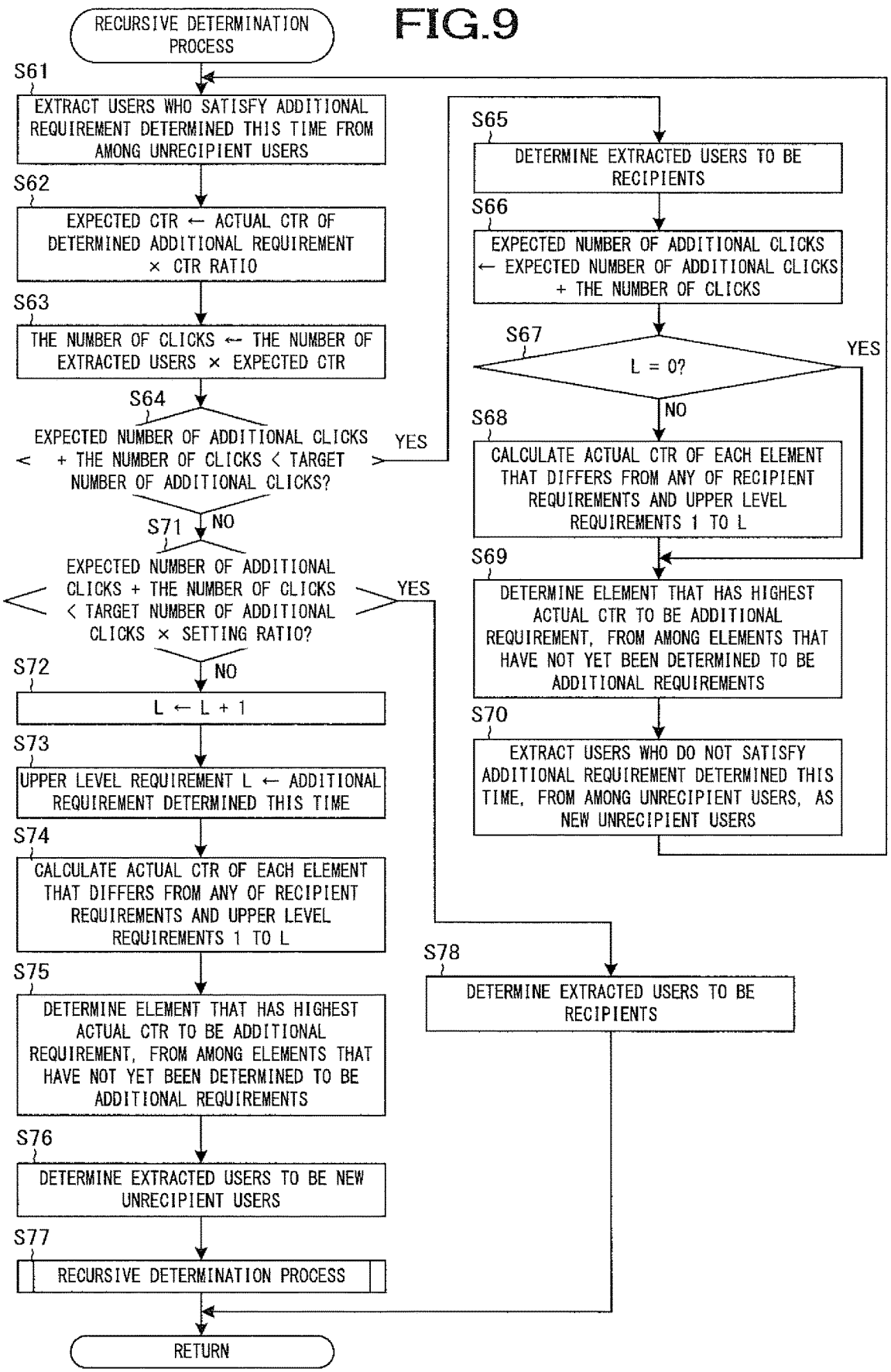
FIG. 9 is a flowchart showing an example of a recursive determination process in the system controller 14 of the advertisement delivery server 1 according to an embodiment.

FIG. 9 is a flowchart showing an example of the recursive determination process in the system controller 14 of the advertisement delivery server 1 according to this embodiment. As shown in FIG. 9, the adding unit 144 extracts users who satisfy the additional requirement determined this time, from among the unrecipient users (Step S61). Subsequently, the adding unit 144 multiplies the actual CTR of the additional requirement determined this time by the CTR ratio, to calculate an expected CTR at the end of the specified period (Step S62). Next, adding unit 144 multiplies the number of users extracted in Step S61 by the expected CTR to calculate the number of clicks (Step S63). After that, the adding unit 144 determines whether the sum of the expected number of additional clicks at the current time and the number of clicks is less than the target number of additional clicks (Step S64). If the adding unit 144 determines that the sum of the expected number of additional clicks and the number of clicks is less than the target number of additional clicks (YES in Step S64), the process proceeds to Step S65. On the other hand, if the adding unit 144 determines that the sum of the expected number of additional clicks and the number of clicks is not less than the target number of additional clicks (NO in Step S64), the process proceeds to Step S71.

In Step S65, the adding unit 144 adds the user IDs of the users extracted in Step S61 to the additional recipient list. Subsequently, the adding unit 144 adds the number of clicks to the expected number of additional clicks at the current time to update the expected number of additional clicks (Step S66). Next, the adding unit 144 determines whether the level L is 0 (Step S67). If the adding unit 144 determines that the level L is 0 (YES in Step S67), the process proceeds to Step S69. In Step S69, from among limiting elements that differ from any of the recipient requirements and that have not yet been determined to be the additional requirements, the adding unit 144 determines a limiting element that has the highest actual CTR to be an additional requirement. In this step, the adding unit 144 determines the additional requirement from among limiting elements that do not have an exclusive relationship with the recipient requirements. The adding unit 144 may also determine, for example, a limiting element that has an exclusive relationship with the additional requirements determined before to be an additional requirement. On the other hand, if the adding unit 144 determines that the level L is not 0 (NO in Step S67), the process proceeds to Step S68. In Step S68, the adding unit 144 updates the current actual CTR for each limiting element that differs from any of the recipient requirements and upper level requirements 1 to L. Specifically, based on the recipient list, the adding unit 144 extracts users who satisfy all the upper level requirements 1 to L, from among the users who are the first recipients and the users who were determined to be the additional recipients before, as a population. Subsequently, the adding unit 144 extracts, for each limiting element that differs from any of the recipient requirements and the upper level requirements 1 to L, users who satisfy the limiting element from the population. After that, the adding unit 144 calculates, for each limiting element, the number of users who selected the advertisement to be additionally delivered, by searching the click history DB 123 for the user IDs of users who satisfy the limiting element and the click history corresponding to the advertisement ID of the advertisement. The adding unit 144 then divides the number of users who selected the advertisement by the number of users who satisfy the limiting element to calculate the actual number of clicks. Next, the adding unit 144 causes the process to proceed to Step S69. The adding unit 144 performs Steps S62, S69, S74, and S75 using the latest actual CTR. After S69, the adding unit 144 extracts users who do not satisfy the additional requirement determined this time, from among the unrecipient users, as new unrecipient users (Step S70). Next, the adding unit 144 causes the process to proceed to Step S61.

In Step S71, the adding unit 144 multiplies the target number of additional clicks by a setting ratio stored in the storage unit 12 to calculate an upper click count limit. The adding unit 144 then determines whether the sum of the expected number of additional clicks and the number of clicks is less than the upper click count limit. If the adding unit 144 determines that the sum of the expected number of additional clicks and the number of clicks is not less than the upper click count limit (NO in Step S71), the process proceeds to Step S72. In Step S72, the adding unit 144 adds 1 to the level L. Subsequently, the adding unit 144 determines the additional requirement determined this time to be an upper level requirement L (Step S73). Next, the adding unit 144 updates the current actual CTR for each limiting element that differs from any of the recipient requirements and the upper level requirements 1 to L (Step S74). After that, from among limiting elements that differ from any of the recipient requirements and that have not yet been determined to be the additional requirements, the adding unit 144 determines a limiting element that has the highest actual CTR to be an additional requirement (Step S75). In this step, the adding unit 144 determines the additional requirement from among limiting elements that do not have an exclusive relationship with any of the recipient requirements and the upper level requirements 1 to L. Subsequently, the adding unit 144 determines the users extracted in Step S61 to be new unrecipient users (Step S76). Next, the adding unit 144 recursively performs the recursive determination process (Step S77).

In Step S71, if the adding unit 144 determines that the sum of the expected number of additional clicks and the number of clicks is less than the upper click count limit (YES in Step S71), the process proceeds to Step S78. In Step S78, the adding unit 144 adds the user IDs of the users extracted in Step S61 to the additional recipient list. After Step S77 or S78, the adding unit 144 causes the process to return back to the caller of this process, the additional requirement/recipient determination process or the recursive determination process.

After the recursive determination process in FIG. 8, as shown in FIG. 7A, the additional delivery controller 145 makes deliveries of the advertisement to the additional recipients, based on the additional recipient list (Step S28). This step is the same as Step S15 shown in FIG. 6B. Subsequently, the additional delivery controller 145 registers an advertisement delivery log (Step S29). Specifically, the additional delivery controller 145 obtains the current date and time as the delivery date and time. The additional delivery controller 145 also counts the user IDs stored in the additional recipient list to calculate the number of additional deliveries. The first delivery controller 145 then stores the delivery date and time, the number of additional deliveries, and the additional recipient list in association with the advertisement ID in the advertisement delivery history DB 122. After Step S29, the additional delivery controller 145 terminates the additional delivery control process.

As described above, according to this embodiment, the system controller 14 makes deliveries of an advertisement to recipients that are determined based on recipient requirements, a desired number of clicks, and an expected CTR of the advertisement. The system controller 14 also estimates the number of further needed clicks at the end of a specified period, based on an expected number of clicks and the actual number of clicks until a time before the end of the specified period. The system controller 14 also obtains, for each of a plurality of limiting elements that differ from any of the recipient requirements, the actual CTR of an advertisement by a group, among recipients of the advertisement, limited by the limiting element. The system controller 14 also determines additional requirements, based on the actual CTRs. The system controller 14 also determines additional recipients, based on the additional requirements, the actual CTRs of the additional requirements, and the estimated number of further needed clicks. The system controller 14 then controls deliveries of the advertisement to the additional recipients. Consequently, this allows for more efficient deliveries of an advertisement while increasing the probability that the number of clicks of the advertisement will be greater than or equal to a desired number of clicks.

2. Second Embodiment

The following describes a second embodiment. In this embodiment, when determining additional requirements, the advertisement delivery server 1 determines the number of additional requirements to determine, depending on an estimated number of further needed clicks. The larger the number of additional requirements, the smaller the number of users who satisfy all the additional requirements. Therefore, the larger the number of additional requirements, the smaller an expected number of clicks at the end of a specified period. For this reason, the smaller the estimated number of further needed clicks, the more additional requirements the adding unit 144 determines. This makes the number of clicks likely to be closer to the estimated number of further needed clicks. For example, the storage unit 12 may store an additional number table. The additional number table is a table that stores estimated numbers of clicks further needed and the corresponding numbers of additional requirements.

The following describes points of difference between processes in the second and those in the first embodiment, with reference to FIGS. 8 and 9. In the additional requirement/recipient determination process shown in FIG. 8, after Step S54, the adding unit 144 retrieves the number of additional requirements N corresponding to the estimated number of further needed clicks from the additional number table. In Step S55, from among limiting elements that differ from any of the recipient requirements, the adding unit 144 determines N limiting elements that have the highest actual CTR to be additional requirements (Step S55). The adding unit 144 then performs the recursive determination process (Step S56). In the recursive determination process shown in FIG. 9, the adding unit 144 extracts users who satisfy all the N additional requirements determined this time, from among the unrecipient users. In Step S75, the adding unit 144 determines N additional requirements. In Step S69, the adding unit 144 may determine N additional requirements or determine only one additional requirement.

As described above, according to this embodiment, the system controller 14 determines the number of additional requirements, depending on an estimated number of further needed clicks. Consequently, additional recipients can be efficiently limited.

3. Third Embodiment

Figure 10:
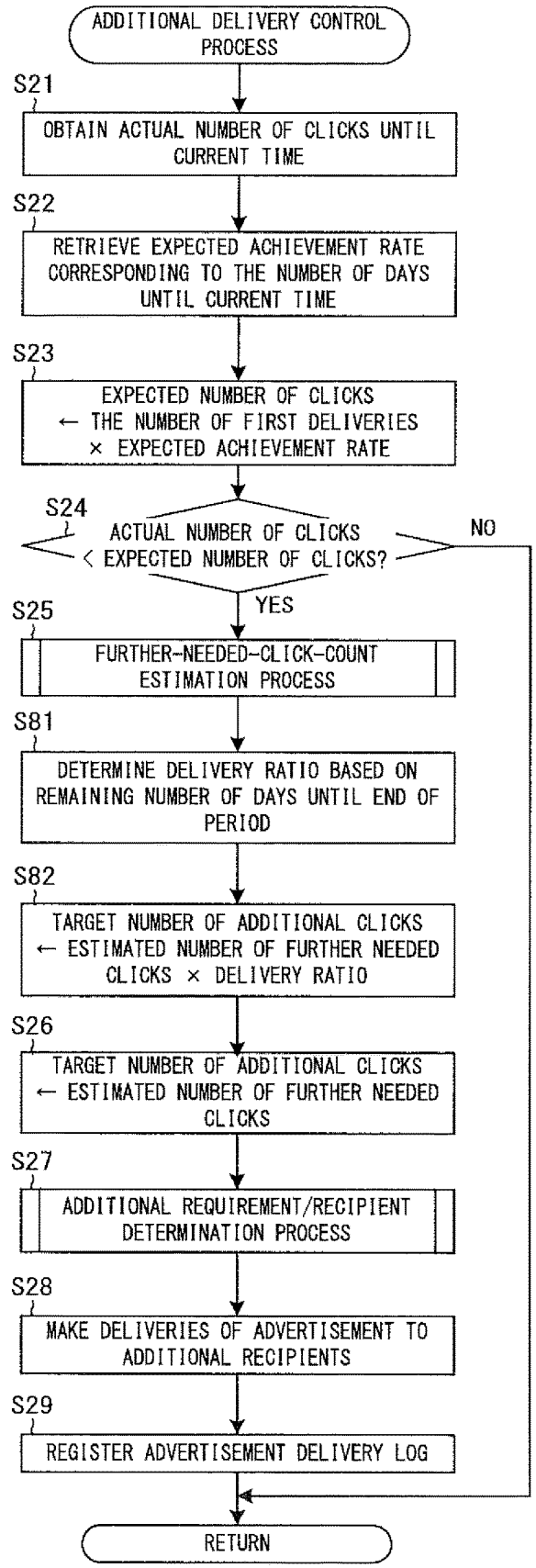
FIG. 10 is a flowchart showing an example of the additional delivery control process in the system controller 14 of the advertisement delivery server 1 according to an embodiment.

The following describes a third embodiment with reference to FIG. 10. In this embodiment, the advertisement delivery server 1 adjusts the number of additional deliveries, depending on the remaining number of days until the end of a specified period. In some cases, the actual number of clicks is less than expected even after the advertisement delivery server 1 made additional deliveries at a time before the end of the specified period. In this case, the advertisement delivery server 1 can make additional deliveries again within the specified period. However, when the number of days until the end of the specified period is relatively small, there is little chance of making additional deliveries or there is no chance of making additional deliveries again. Thus, if the remaining number of days, it is desirable that additional deliveries cause the actual CTR to reliably reach a desired number of clicks at the end of the specified period. For this reason, the smaller the remaining number of days until the end of the specified period, the larger the adding unit 144 makes the number of additional deliveries. Except for points described below, the third embodiment is basically the same as the first and second embodiments.

For example, the adding unit 144 may directly adjust the number of additional deliveries. For example, the storage unit 12 may store a delivery ratio table. The delivery ratio table is a table that stores the remaining numbers of days until the end of the specified period and the corresponding delivery ratios. Each delivery ratio is the ratio of the number of additional deliveries after adjustment to the number of additional deliveries before the adjustment. The delivery ratio may be set to, for example, 1 or higher. For example, the adding unit 144 determines additional requirements and then calculates the number of additional deliveries, based on the actual CTRs of the additional requirements. The adding unit 144 then multiplies the number of additional deliveries by the delivery ratio corresponding to the remaining number of days to determine the number of additional deliveries after adjustment. From among unrecipient users who satisfy the additional requirements, the adding unit 144 determines the same number of users as the number of additional deliveries to be additional recipients.

Also for example, the adding unit 144 may adjust the estimated number of further needed clicks to indirectly adjust the number of additional deliveries. For example, the adding unit 144 may multiply the estimated number of further needed clicks by the delivery ratio corresponding to the remaining number of days, to calculate a target number of additional clicks. The adding unit 144 may then determine additional requirements and additional recipients, based on the target number of additional clicks.

FIG. 10 is a flowchart showing an example of the additional delivery control process in the system controller 14 of the advertisement delivery server 1 according to this embodiment. In FIG. 10, the same steps as in FIG. 7A are denoted by the same reference signs. As shown in FIG. 10, after Steps S21 to S25, the adding unit 144 retrieves, from the delivery ratio table, the delivery ratio corresponding to the remaining number of days until the end of the specified period (Step S81). Subsequently, the adding unit 144 multiplies the estimated number of further needed clicks by the delivery ratio to calculate a target number of additional clicks (Step S82). Next, the system controller 14 performs Steps S26 to S29.

As described above, according to this embodiment, the system controller 14 adjusts the number of additional deliveries, depending on the remaining number of days until the end of a specified period. Consequently, this can increase the probability that the number of clicks to be added will be greater than or equal to the number of further needed clicks.

4. Fourth Embodiment

Figure 11:
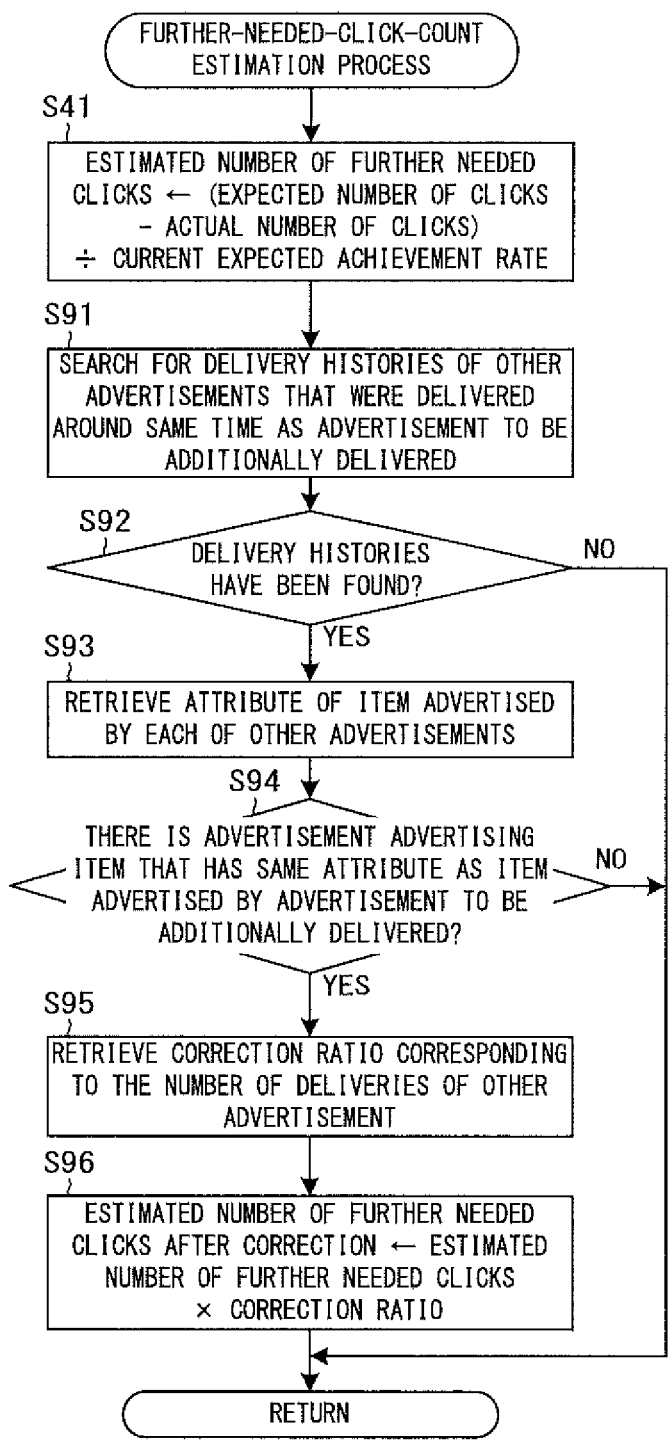
FIG. 11 is a flowchart showing an example of the further-needed-click-count estimation process in the system controller 14 of the advertisement delivery server 1 according to an embodiment.

The following describes a fourth embodiment with reference to FIG. 11. In this embodiment, when deliveries of another advertisement have been made around the same time as those of a target advertisement, the advertisement delivery server 1 corrects an estimated number of further needed clicks depending on the deliveries of the other advertisement. A user who receives another advertisement around the same time as an advertisement to be additionally delivered may select the other advertisement but may not select the advertisement to be additionally delivered. For this reason, when deliveries of another advertisement are made around the same time frame, the advertisement delivery server 1 increases the estimated number of further needed clicks. Except for points described below, the fourth embodiment is basically the same as the first to third embodiments.

Deliveries around the same time may mean, for example, that the times of the deliveries are exactly the same, that the times of the deliveries are at least partially the same, or that deliveries of another advertisement are made during a period to which the time of deliveries of an advertisement to be additionally delivered belongs.

For example, the larger the number of deliveries of another advertisement delivered around the same time, the more the further-needed-click-count estimator 143 may increase the estimated number of further needed clicks. That is because the larger the number of deliveries of the other advertisement, the more likely the number of selections of the advertisement to be additionally delivered is to be reduced. For example, the storage unit 12 may store a correction ratio table. The correction ratio table is a table that stores the numbers of deliveries of another advertisement and the corresponding correction ratios. Each correction ratio is the ratio of an estimated number of further needed clicks after adjustment to an estimated number of further needed clicks before the adjustment. The correction ratio may be set to, for example, 1 or higher.

The further-needed-click-count estimator 143 may correct the estimated number of further needed clicks only when an attribute of an item advertised by the other advertisement delivered around the same time is the same as that of an item advertised by the advertisement to be additionally delivered. This is because a user who has received advertisements for different items that have the same attribute around the same time is highly likely to select only one of the advertisements. Examples of the attribute include categories, functions, specifications, a price range, and a store that sells the item.

FIG. 11 is a flowchart showing an example of the further-needed-click-count estimation process in the system controller 14 of the advertisement delivery server 1 according to this embodiment. In FIG. 11, the same steps as in FIG. 7B are denoted by the same reference signs. As shown in FIG. 11, after calculating an estimated number of further needed clicks (Step S41), the further-needed-click-count estimator 143 searches the advertisement delivery history DB 122 for the advertisement delivery histories of other advertisements that were delivered around the same time as the advertisement to be additionally delivered (Step S91). In this step, the further-needed-click-count estimator 143 searches for advertisement delivery histories that have a delivery time around the same time, based on the delivery date and time included in the advertisement delivery history of the advertisement to be additionally delivered. Subsequently, the further-needed-click-count estimator 143 determines whether the advertisement delivery histories of other advertisements have been found (Step S92). If the further-needed-click-count estimator 143 determines that no advertisement delivery history has been found (NO in Step S92), the further-needed-click-count estimation process is terminated. On the other hand, if the further-needed-click-count estimator 143 determines that advertisement delivery histories have been found (YES in Step S92), the process proceeds to Step S93.

In Step S93, based on the found advertisement delivery histories, the further-needed-click-count estimator 143 retrieves an attribute of an item advertised by each of the other advertisements. For example, the further-needed-click-count estimator 143 may retrieve a category ID corresponding to the advertisement ID included in each of the found advertisement delivery histories from the advertisement DB 121. Subsequently, the further-needed-click-count estimator 143 determines whether there is an advertisement advertising an item that has the same attribute as an item advertised by the advertisement to be additionally delivered, among the advertisements delivered around the same time (Step S94). For example, the further-needed-click-count estimator 143 may determine whether the category ID of the item advertised by each of the other advertisements is the same as that of the item advertised the advertisement to be additionally delivered. If the further-needed-click-count estimator 143 determines that there is no advertisement advertising the item that has the same attribute as the item advertised by the advertisement to be additionally delivered (NO in Step S94), the further-needed-click-count estimation process is terminated. On the other hand, if the further-needed-click-count estimator 143 determines that there is another advertisement advertising the item that has the same attribute as the item advertised by the advertisement to be additionally delivered (YES in Step S94), the process proceeds to Step S95.

In Step S95, the further-needed-click-count estimator 143 obtains the number of deliveries of the other advertisement advertising the item that has the same attribute as the item advertised by the advertisement to be additionally delivered from the corresponding advertisement delivery history. The further-needed-click-count estimator 143 then retrieves the correction ratio corresponding to the retrieved number of deliveries from the correction ratio table (Step S95). Subsequently, the further-needed-click-count estimator 143 multiplies the estimated number of further needed clicks calculated in Step S41 by the correction ratio, to calculate an estimated number of further needed clicks after correction (Step S96). After Step S96, the further-needed-click-count estimator 143 terminates the further-needed-click-count estimation process.

As described above, according to this embodiment, when deliveries of another advertisement have been made around the same time as those of an advertisement to be additionally delivered, the system controller 14 corrects an estimated number of further needed clicks depending on the deliveries of the other advertisement. Consequently, the number of further needed clicks can be properly estimated.

The system controller 14 may also correct the estimated number of further needed clicks when an attribute of an object advertised by the other advertisement is the same as that of an object advertised by the advertisement to be additionally delivered. In this case, the number of further needed clicks can be more properly estimated.

In the above embodiments, the present invention is applied to an online marketplace in which a plurality of stores sell items. However, the present invention may be applied to an e-commerce website in which a single store sells items. A thing to be advertised may be different from any item. Examples of the thing to be advertised include a service, an event, a company, an organization, a group, and an individual.

REFERENCE SIGNS LIST 1 advertisement delivery server
2 online marketplace server
3 store terminal
4 user terminal
11 communication unit
12 storage unit
121 advertisement DB
122 advertisement delivery history DB
123 click history DB
13 input/output interface
14 system controller
14a CPU
14b ROM
14c RAM
15 system bus
21 member information DB 22 viewing history DB
23 purchase history DB
NW network
S information processing system

The invention claimed is:
1. An information processing device for determining users to receive an advertisement, the information processing device comprising:
  at least one memory configured to store computer program code; and
  at least one processor configured to access said computer program code and operate according to said computer program code, said computer program code including:
    delivery control code configured to cause at least one of said processor to control by a server, delivery by email of an initial quantity of the advertisement to a first plurality of recipients among a plurality of possible recipients after a commencement of a counting period, wherein the counting period extends from a beginning of the counting period to an end of the counting period, wherein delivery requirements of the advertisement include: i) a first limiting element for limiting delivery of the advertisement, and ii) a specified number of selections of the advertisement by recipients, the first plurality of recipients being determined based on: i) satisfying the first limiting element, ii) the specified number of selections, and ii) an expected selection rate of the advertisement,
    estimating code configured to cause at least one of said processor to estimate, after the beginning of the counting period and before the end of the counting period, an estimated number of further clicks by the end of the counting period, wherein the estimated number of further clicks is based on: i) an expected number of selections indicating how many recipients among the first plurality of recipients were expected to select the advertisement within a first time interval, and ii) an actual number of selections indicating how many recipients among the first plurality of recipients actually selected the advertisement within the first time interval;
    obtaining code configured to cause at least one of said processor to obtain, for each of a plurality of second limiting elements different from the first limiting element, an actual selection rate of the advertisement by a historical group of recipients among the plurality of possible recipients, wherein the historical group of recipients is identified in a history database as having selected an advertisement in the past and the historical group of recipients satisfies a corresponding second limiting element among the plurality of second limiting elements,
    element determination code configured to cause at least one of said processor to determine at least one specific second limiting element to be added to the delivery requirements from among the plurality of second limiting elements, based on the actual selection rates, and
    recipient determination code configured to cause at least one of said processor to:
      A) determine a number of additional deliveries based on: i) the estimated number of further clicks and ii) the actual selection rate of the advertisement corresponding to the at least one specific second limiting element, and
      B) determine additional recipients among the plurality of possible recipients of the advertisement from a member information database, based on: i) satisfying the first limiting element, and ii) satisfying the at least one specific second limiting element, wherein a number of additional recipients is set to the determined number of additional deliveries,
    wherein the delivery control code is further configured to cause at least one of said processor to control delivery, by the server, by email of the advertisement to the determined additional recipients.

2. The information processing device according to claim 1, further comprising:
  number determination code configured to cause at least one of said processor to determine a number of additional limiting elements, depending on the estimated number of further clicks, wherein
  the element determination code is further configured to cause at least one of said processor to set a number of the at least one specific second limiting element to be the determined number of additional limiting elements.

3. The information processing device according to claim 1, further comprising:
  adjusting code configured to cause at least one of said processor to adjust a number of additional deliveries of the advertisement, depending on a remaining time until the end of the counting period, wherein
  the recipient determination code causes at least one of said processor to set the number of additional recipients to be an adjusted number of additional deliveries.

4. The information processing device according to claim 1, wherein
  when deliveries of a second advertisement have been made separately around the same time as those of the advertisement, the estimating code causes at least one of said processor to correct the estimated number of further clicks, depending on the deliveries of the second advertisement.

5. The information processing device according to claim 4, wherein
  when an attribute of an object advertised by the second advertisement is the same as that of an object advertised by the advertisement, the estimating code causes at least one of said processor to correct the estimated number of further clicks.

6. An information processing method for determining users to receive an advertisement, the information processing method performed by a computer, the information processing method comprising:
  controlling delivery, by a server, by email of an initial quantity of the advertisement to a first plurality of recipients among a plurality of possible recipients after a commencement of a counting period, wherein the counting period extends from a beginning of the counting period to an end of the counting period, wherein delivery requirements of the advertisement include: i) a first limiting element for limiting delivery of the advertisement, and ii) a specified number of selections of the advertisement by recipients, the first plurality of recipients being determined based on: i) satisfying the first limiting element, ii) the specified number of selection, and ii) an expected selection rate of the advertisement;
  estimating, after the beginning of the counting period and before the end of the counting period, an estimated number of further clicks by the end of the counting period, wherein the estimated number of further clicks is based on: i) an expected number of selections indicating how many recipients among the first plurality of recipients were expected to select the advertisement within a first time interval, and ii) an actual number of selections indicating how many recipients among the first plurality of recipients actually selected the advertisement within the first time interval;

obtaining, for each of a plurality of second limiting elements different from the first limiting element, an actual selection rate of the advertisement by a historical group of recipients among the plurality of possible recipients, wherein the historical group of recipients is identified in a history database as having selected an advertisement in the past and the historical group of recipients satisfies a corresponding second limiting element among the plurality of second limiting elements;

determining at least one specific second limiting element to be added to the delivery requirements from among the plurality of second limiting elements, based on the actual selection rates;

determining a number of additional deliveries based on: i) the estimated number of further clicks and ii) the actual selection rate of the advertisement corresponding to the at least one specific second limiting element;

determining additional recipients among the plurality of possible recipients of the advertisement from a member information database, based on: i) satisfying the first limiting element, and ii) satisfying the at least one specific second limiting element, wherein a number of additional recipients is set to the determined number of additional deliveries; and controlling delivery, by the server, by email of the advertisement to the determined additional recipients.

7. A non-transitory computer readable medium storing thereon an information processing program for determining users to receive an advertisement, the information processing program causing a computer to:

control delivery, by a server, by email of an initial quantity of the advertisement to a first plurality of recipients among a plurality of possible recipients after a commencement of a counting period, wherein the counting period extends from a beginning of the counting period to an end of the counting period, wherein delivery requirements of the advertisement include: i) a first limiting element for limiting delivery of the advertisement, and ii) a specified number of selections of the advertisement by recipients, the first plurality of recipients being determined based on: i) satisfying the first limiting element, ii) the specified number of selections, and ii) an expected selection rate of the advertisement;

estimate, after the beginning of the counting period and before the end of the counting period, an estimated number of further clicks by the end of the counting period, wherein the estimated number of further clicks is based on: i) an expected number of selections indicating how many recipients among the first plurality of recipients were expected to select the advertisement within a first time interval, and ii) an actual number of selections indicating how many recipients among the first plurality of recipients actually selected the advertisement within the first time interval;

obtain, for each of a plurality of second limiting elements different from the first limiting element, an actual selection rate of the advertisement by a historical group of recipients among the plurality of possible recipients, wherein the historical group of recipients is identified in a history database as having selected an advertisement in the past and the historical group of recipients satisfies a corresponding second limiting element among the plurality of second limiting elements;

determined at least one specific second limiting elements to be added to the delivery requirements from among the plurality of second limiting elements, based on the actual selection rates;

determine a number of additional deliveries based on: i) the estimated number of further clicks and ii) the actual selection rate of the advertisement corresponding to the at least one specific second limiting element:

determine additional recipients among the plurality of possible recipients of the advertisement from a member information database, based on: i) satisfying the first limiting element, and ii) satisfying the at least one specific second limiting element, wherein a number of additional recipients is set to the determined number of additional deliveries; and control delivery, by the server, by email of the advertisement to the determined additional recipients.

* * * * *